(12) United States Patent
Gagné-Langevin et al.

(10) Patent No.: US 10,140,263 B2
(45) Date of Patent: Nov. 27, 2018

(54) SYSTEM AND METHOD FOR GENERATING TASK-EMBEDDED DOCUMENTS

(71) Applicants: Maud Gagné-Langevin, Toronto (CA); FOULNES SERVICES CORP., Tortola (VG)

(72) Inventors: Maud Gagné-Langevin, Toronto (CA); Valeriy Fedorov, Mykolayiv (UA); Maksim Gritsay, Mykolayiv (UA); Alexander Potapov, Mykolayiv (UA); Mikhail Pelyanskiy, Mykolayiv (UA); Svetlana Krivoshey, Mykolayiv (UA); Anna Shabalina, Mykolayiv (UA)

(73) Assignees: Maud Gagné-Langevin, Toronto (CA); FOULNES SERVICES CORP., Tortola (VG)

( * ) Notice: Subject to any disclaimer, the term of this patent is extended or adjusted under 35 U.S.C. 154(b) by 0 days.

(21) Appl. No.: 15/316,787

(22) PCT Filed: May 12, 2015

(86) PCT No.: PCT/CA2015/050427
§ 371 (c)(1),
(2) Date: Dec. 6, 2016

(87) PCT Pub. No.: WO2015/184534
PCT Pub. Date: Dec. 10, 2015

(65) Prior Publication Data
US 2017/0185569 A1    Jun. 29, 2017

Related U.S. Application Data

(60) Provisional application No. 62/008,743, filed on Jun. 6, 2014.

(51) Int. Cl.
*G06F 17/20* (2006.01)
*G06F 17/21* (2006.01)
(Continued)

(52) U.S. Cl.
CPC .......... *G06F 17/218* (2013.01); *G06F 17/212* (2013.01); *G06F 17/24* (2013.01);
(Continued)

(58) Field of Classification Search
None
See application file for complete search history.

(56) References Cited

U.S. PATENT DOCUMENTS 6,182,095 B1    1/2001    Leymaster et al.
7,360,156 B1    4/2008    Braun et al.
(Continued)

OTHER PUBLICATIONS

International Search Report dated Jul. 27, 2015 from PCT/CA2015/050427, 3 pgs.
(Continued)

*Primary Examiner* — Keith D Bloomquist
*Assistant Examiner* — Shahid K Khan
(74) *Attorney, Agent, or Firm* — Jenna L. Wilson; Wilson Lue LLP

(57) ABSTRACT

A method and system are provided for processing a document comprising a plurality of content portions. An editing copy of the document is generated. The editing copy includes embedded code identifying at least one task corresponding to at least one content portion of the document, the code defining at least one user interface element for presentation proximate to the at least one content portion and within the editing copy when the editing copy is rendered and presented. The editing copy is sent to a user system for rendering and presentation at the user system. When a user interface element for a task is activated at the user system, a request is sent to the system to execute the identified task; the task is executed and a result sent to the user system for presentation.

19 Claims, 26 Drawing Sheets

(51) Int. Cl.
*G06Q 10/10* (2012.01)
*G06F 17/24* (2006.01)
*G06F 17/27* (2006.01)

(52) U.S. Cl.
CPC .......... *G06F 17/241* (2013.01); *G06F 17/245* (2013.01); *G06F 17/248* (2013.01); *G06F 17/2725* (2013.01); *G06Q 10/101* (2013.01)

(56) References Cited

U.S. PATENT DOCUMENTS

| | | | |
|---|---|---|---|
| 7,644,350 B2 * | 1/2010 | Piersol | G06F 17/243 |
| | | | 715/221 |
| 7,689,899 B2 | 3/2010 | Leymaster et al. | |
| 7,698,635 B2 | 4/2010 | Grigoriadis et al. | |
| 7,849,030 B2 | 12/2010 | Ellingsworth | |
| 7,937,663 B2 | 5/2011 | Parker et al. | |
| 8,266,524 B2 | 9/2012 | Bailey | |
| 8,285,750 B2 | 10/2012 | Anderson | |
| 8,381,088 B2 | 2/2013 | Kikin-Gil et al. | |
| 8,386,511 B2 | 2/2013 | Schneider | |
| 8,479,090 B2 | 7/2013 | Lemonik et al. | |
| 8,745,488 B1 * | 6/2014 | Wong | G06F 17/24 |
| | | | 715/221 |
| 8,781,815 B1 | 7/2014 | Gidney | |
| 8,788,523 B2 | 7/2014 | Martin et al. | |
| 9,003,276 B2 | 4/2015 | Harrop et al. | |
| 2001/0054046 A1 * | 12/2001 | Mikhailov | G06F 17/243 |
| | | | 715/221 |
| 2003/0126555 A1 * | 7/2003 | Aggarwal | G06F 9/451 |
| | | | 715/221 |
| 2004/0088332 A1 | 5/2004 | Lee et al. | |
| 2006/0156216 A1 * | 7/2006 | Chen | G06F 17/243 |
| | | | 715/205 |
| 2007/0061738 A1 | 3/2007 | Taboada et al. | |
| 2009/0216715 A1 | 8/2009 | Dexter | |
| 2010/0100803 A1 | 4/2010 | Okushiro et al. | |
| 2013/0086470 A1 | 4/2013 | Dorr et al. | |
| 2015/0006564 A1 | 1/2015 | Tomkins et al. | |
| 2015/0095716 A1 * | 4/2015 | Beuchert | G06F 17/30985 |
| | | | 714/46 |

OTHER PUBLICATIONS

International Search Report dated Jul. 29, 2015 from PCT/CA2015/050524, 3 pgs.
Robins, Rachel, "Managing Tasks in Confluence", Jan. 27, 2015, https://confluence.atlassian.com/display/CONF54/Managing+Tasks+in_Confluence, pp. 1-25.

* cited by examiner

SYSTEM AND METHOD FOR GENERATING TASK-EMBEDDED DOCUMENTS

CROSS-REFERENCE TO RELATED APPLICATIONS

This application references and claims priority to U.S. Provisional Application No. 62/008,743 filed on Jun. 6, 2014, the entirety of which is incorporated herein by reference.

BACKGROUND

1. Technical Field

The present disclosure relates to document processing, and in particular identification and management of tasks associated with a document for the purposes of document editing, validation, and analysis.

2. Description of the Related Art

Numerous solutions have been proposed for automated document creation and review to reduce the workload on those personnel tasked with scrutinizing and validating documents. For instance, some tools automatically generate documents from brief answers entered in a questionnaire; the input information is used to populate a standard form document. This type of tool is suitable for documents that only require input of discrete, atomic items of information (such as names, addresses, asset or debt listings and the like), where the remaining document content is pre-written, and the interpretation of the document is less likely to be nuanced by the input information. Examples of such documents include loan applications and purchase orders.

Such automated document creation and review tools, however, are less suitable for "bespoke" documents in which much of the content is customized to reflect unique situations or relationships between parties. Examples of such bespoke documents can include prospectuses and other disclosure documents of different types in various commercial and industrial sectors, non-standard contracts, court pleadings, and even patent applications. Other computerized solutions have been proposed to automatically validate legal instruments and complex business documents through text analytics and other techniques to compare document content against predetermined text passages.

These solutions, generally, are intended to improve efficiency in the review and validation process by eliminating or reducing the need for human clerical or professional skill and judgment. While improved efficiency may be a desirable goal, these types of automated solutions are heavily reliant on proper advance preparation of a standard form document, or of a library of standard texts and a lexical analysis engine.

BRIEF DESCRIPTION OF THE DRAWINGS

In drawings which illustrate by way of example only embodiments of the present application.

DETAILED DESCRIPTION

Figure 1:
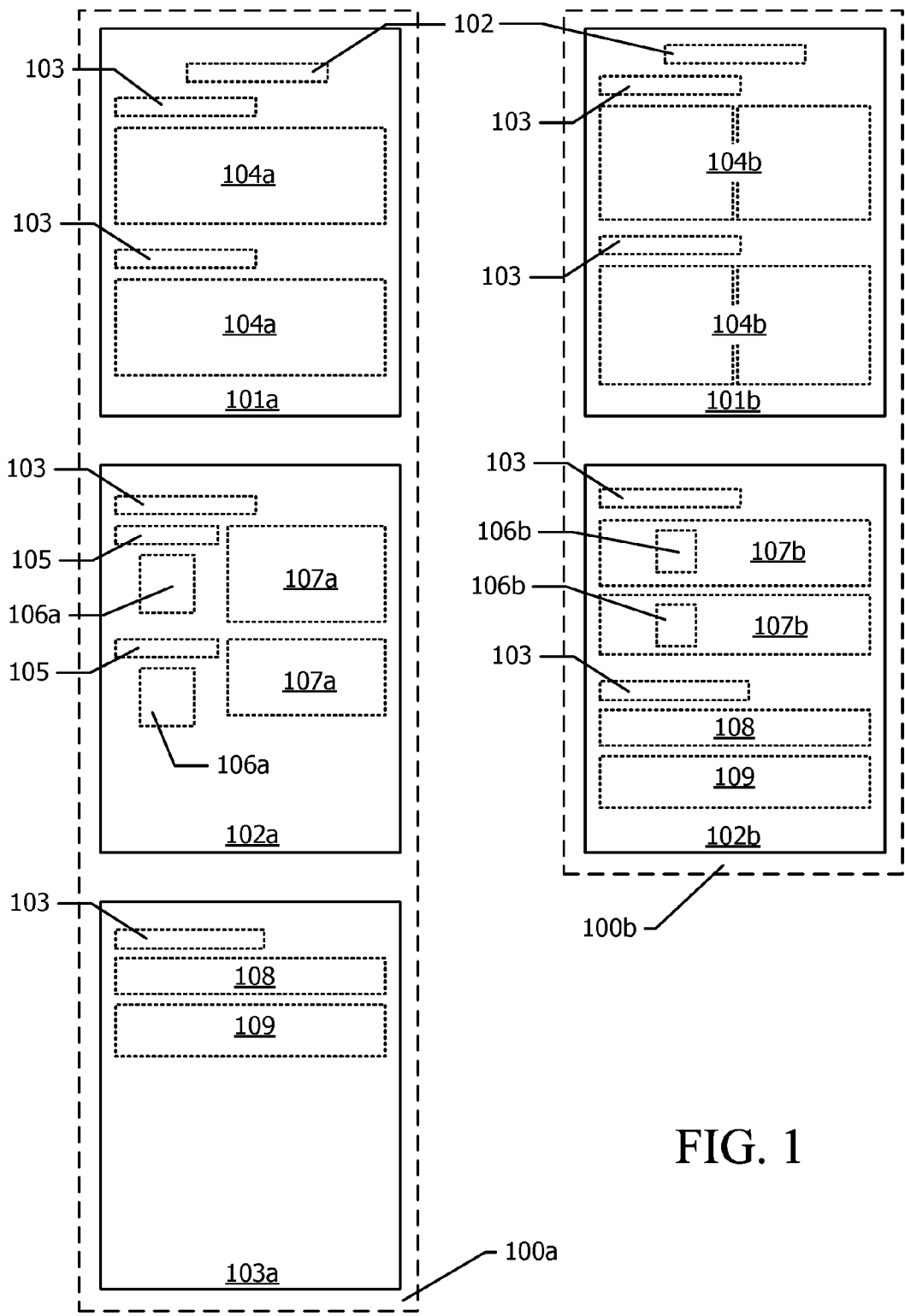
FIG. 1 is a schematic illustrating possible physical layouts of documents containing similar content.

Many documents generated or received in the course of the operation of an enterprise or other organization are subject to approval or review mechanisms that can involve review or validation against pre-set rules or requirements, best practices, and/or internal consistency requirements.

Some types of documents lend themselves more readily to automated processing for validation purposes than others; for instance, documents that predominantly consist of line items with relatively short descriptions, such as invoices, requisitions, bills of lading, etc. can be automatically rendered in computer-understandable format if they are not already (e.g., by optical character recognition (OCR)), and their content compared to predefined templates with relative ease. Indeed, a number of standards have been defined for electronic document creation and exchange for business, transport, engineering, and medical purposes. Such standards are most easily implemented where language and forms of expression are normalized and there is strict or nearly-strict adherence to normalized expressions when the documents are generated.

Other types of documents are subject to greater variation between one document and the next, not only in substantive content, but also in expression. This can occur when the author(s) or publisher of a document are able to exercise creative or professional control over the document content, even when the substantive content is prescribed by a rulemaker or guideline. This situation arises, for example, in the context of financial or corporate disclosure documents: while governing regulations may identify required components of a disclosure document, there may be different manners of expressing these required components in text. The actual text content of a document will necessarily vary according to the subject of the disclosure document, the disclosing entity, and/or the practices and writing style of the individual (or individuals) preparing the document.

Furthermore, the creator of the document, or the party responsible for preparing the document for publication, may apply their own layouts and page designs to the document. Such layouts and designs may be intended to improve human comprehension of the document, for instance by presenting data in tabular format, or by applying different formatting to different parts of the text, such as titles or headings, subheadings, paragraphs, and the like. Formatting can include text alignment (left-aligned, right-aligned, justified, or centered), font face and size, text decoration (e.g. bold, italics, underline) or variations in tabular layouts (e.g., merging or splitting individual cells). Some content may be presented as footnotes or endnotes rather than contained in the main body text of the document, and are denoted by numbers, letters, or other symbols that are referenced in the main body text. Other layout and design features can include ornamental features that are not primarily intended to affect human comprehension of the document, such as shading, color, and graphic elements. The combination of layout and design features can be considered to be the presentation template or presentation format of the document. The presentation format of the document may be defined in a word processing or desktop publishing template that is applied to an electronic form of the document, or it may be created on the fly by the document creator or preparer.

FIG. 1 illustrates, in schematic form, different presentation formats for similar document content intended to be presented on standard-sized sheets of paper (e.g., letter size (8.5×11") or A4). Two documents 100a and 100b with similar content are illustrated. As can be seen in the drawing, the content of document 100a breaks over three sheets of paper, or pages 101a, 102a, and 103a, whereas the content of document 100b breaks over only two pages 101b and 102b, due primarily to design variations between the presentation formats of documents 100a, 100b. In this example, both documents include a main title 102; headings 103 preceding major sections or portions of content; optional subheadings; paragraphs of text; and images. While the main title 102 and the headings 103 may contain identical content and are laid out in a similar manner (here, the main title 102 is centred in both documents, while headings 103 are left-aligned), other content is presented differently. For example, text portions 104a in document 100a are laid out substantially across the printable width of the document in a single column, the same content in text portions 104b in document 100b are laid out in a two-column arrangement. The second page of either document 100a, 100b may include the same or very similar biographical content, laid out differently. In document 100a, the names of the subjects are presented in subheadings 105, but not presented as subheadings in document 100b at all. In document 100b, they are instead included in the main biographical text 107b. Both documents 100a, 100b can include images of the subject 106a, 106b; but in document 100b, the text in biographical text 107b wraps around the images 106b whereas in document 100a the biographical text 107a is presented to the right of the images 106a.

These layout differences may result in similar content occupying more or less of a single page; the effect is illustrated in FIG. 1, as document 100a spans three pages while document 100b requires only two. In addition to such layout differences, different choices may be made regarding font size and face, line spacing, margin widths, header and footer depths, and so on, also resulting in different white space and/or pagination. While FIG. 1 illustrates document content intended for presentation on paper sheets, it will be appreciated by those skilled in the art that differences in presentation format can also affect pagination of content in electronic documents. It is common, for instance, for documents formatted for print to be rendered in PDF or other electronic document formats, so the differences resulting from the layout and formatting choices in documents 100a and 100b would apply to electronic versions of the documents as well. Differences in layout and formatting will similarly affect the appearance and pagination of documents primarily intended to be presented onscreen, such as slides (e.g., Microsoft PowerPoint™ format) or webpages.

Moreover, the documents that are subject to approval or review may not have been generated by the party conducting the approval or review process. Instead, the approving or reviewing party may be attempting to review a third party document. In those cases, the reviewing party may not have access to a source electronic document that would permit easy access to electronically searchable text content for automated review purposes. Rather, the reviewing party may have been provided only with a printed version of the document, which must be scanned and converted to a format that can be electronically processed (e.g., by OCR). In that case, the presentation format may interfere with the OCR process.

Aside from these impediments to automated processing for the purpose of approval or review, it will also be appreciated by those skilled in the art that the approval or review process itself is subject to change. Best practices and internal requirements may evolve over time, and rules and requirements may similarly evolve and change. Often times, this guidance originates outside the organization, and the information sources for this guidance may be decentralized. For instance, laws, regulations, and guidelines governing the content of documents may originate from a number of jurisdictions. Best practices and other guidance may be published in secondary sources that are either print or electronic, such as textbooks, reference books, online databases, and the like.

Still other sources of reference information that may be used in reviewing or approving documents are exemplars or precedents. In the legal field, for example, precedent documents are used as models to assist in composition of new legal documents. The precedent document itself may be modified to add new content and delete irrelevant content, or else the new document is composed and then compared to the precedent. Similarly, in other fields, existing documents may be used as models to assist in the composition of new documents. These exemplars or precedents may have originated from third parties, and may have been received in either print or electronic format.

All of the foregoing reference information sources may be available electronically, but even so, they are typically not integrated into an automated document review process. For instance, the reviewing party may be editing or reviewing the document by computer using a word processor, but reference materials may be stored in an online resource accessed using a web browser or dedicated application.

Further, as noted above, many automated solutions that have been proposed for improving efficiency in document generation, review, and validation are generally intended to reduce the need for clerical or professional input. While automation in this manner may reduce the human resource cost in generating and reviewing documents, there still remains a need for the exercise of professional skill and judgment in the preparation and review of many types of documents, particularly "bespoke" documents. Human judgment cannot be completely delegated to computers.

Accordingly, the examples and embodiments described herein provide an improved system, method, and data processing device-readable medium for implementing and managing automated document analysis and review in combination with task management and execution so as to improve efficiency in document generation, review, editing, and validation. Electronic versions of documents, which may have digitized from a printed source and/or may have been originally generated in a non-standard layout or format, are validated against prescribed elements either defined in advance for the document type or identified within the document itself. Based on the result of the validation, specific tasks are identified for discrete portions of content within the document and, in some embodiments, the document is altered to include identification of the tasks. While the validation, identification of tasks, and alteration of the document may be carried out remotely from the user at a server system accessible over a network, the tasks can be invoked at a client device when the document is displayed. In some examples, the identification of the task added to the document includes code for rendering a graphical user interface element for display together with the relevant document portion on a display screen, such that the graphical user interface element can be actuated or activated to invoke the related task. The system thus facilitates on-point identification and execution of tasks for discrete portions of a single document, and, in some embodiments, merges the user's supplied document with a task-based framework to produce a portable, combined editable document and task list that the user can edit and execute on a variety of platforms and locations. The tasks may include validation tasks, checks for data consistency, data lookups (e.g., to query a source for relevant reference material), and automated generation of reports based on the document content. When the user views the combined document on a client platform, certain tasks may be executed by a server. Changes made to the document resulting from invocation of tasks may be stored locally or selectively transmitted to the server for remote storage.

Figure 2:
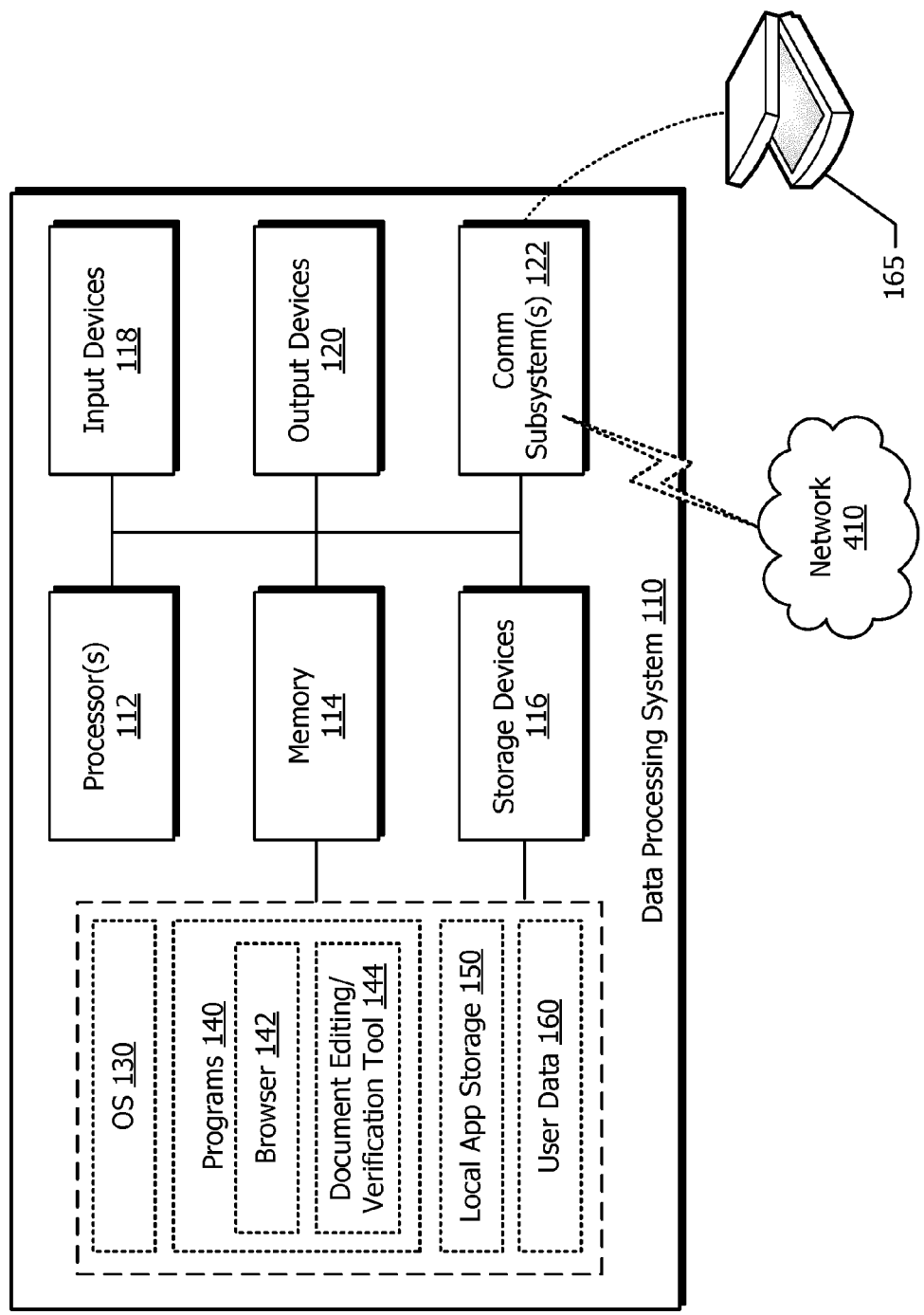
FIG. 2 is a schematic of select components of a client computing system optionally in communication with a network and a scanning device.
Figure 4:
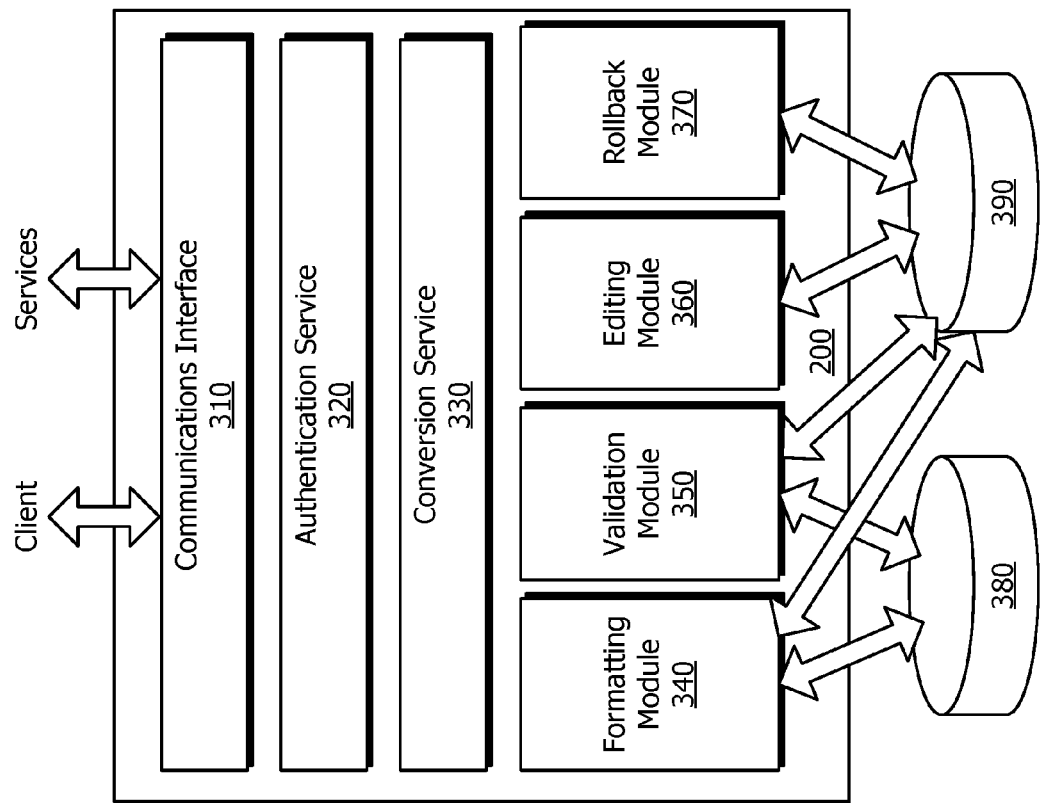
FIG. 4 is a further schematic of select modules of the server of FIG. 3.
Figure 3:
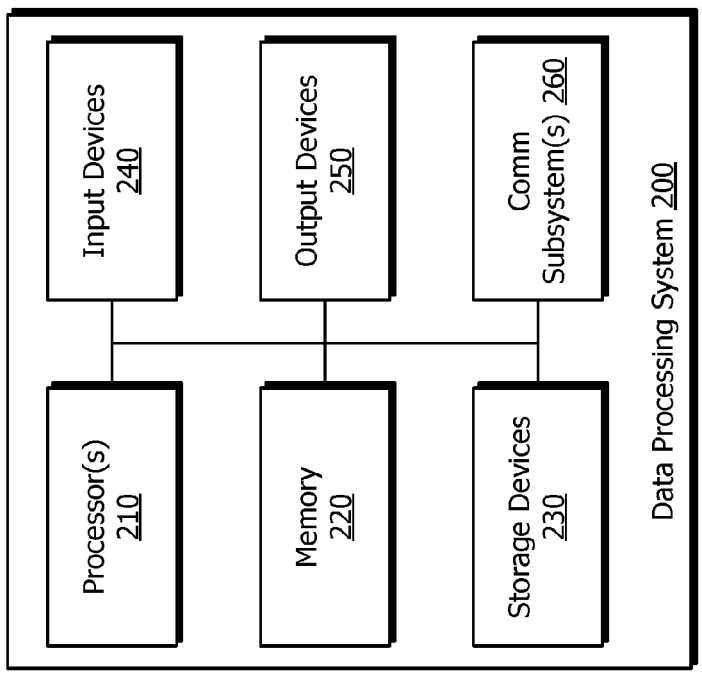
FIG. 3 is a schematic of select components of a server computing system.

These embodiments and examples are described and illustrated primarily in the context of a data processing environment comprising one or more data processing systems, which may operate over a local or wide-area network. FIGS. 2-4 illustrate select components of data processing devices or systems that are suitable for use in the contemplated data processing environment.

FIG. 2 is a block diagram of select components of an example client data processing system 110, which may be embodied in a single device, such as a desktop computer, workstation or terminal, mobile computer (e.g., laptop computer, tablet computer, or smartphone). While the example system 110 is illustrated herein as a desktop computer or workstation, it will be appreciated by those skilled in the art that this is not intended to be limiting, and the solutions described herein may be implemented on any suitable data processing device that is configurable to operate as described, whether or not this device is primarily intended for productivity uses or other types of uses.

Operation of the system 110 is generally controlled by a main processor or processors 112. The system 110 may be operated under mains power or may be a battery-powered device; these features are not illustrated in FIG. 2 for ease of exposition. Data, programs, and other instructions or information can be stored in one of several possible memory components of the system 110, such as internal memory 114 (which can include standard volatile and non-volatile memory components, which can be integrated with other components such as the processor 112 or provided as distinct components). Information can also be stored in the system 110 on other storage devices, either internal or external, such as hard drives, flash drives, memory cards, and peripheral devices, not shown in FIG. 2. Typically, software and data components such as the operating system (OS) 130, programs (applications) 140, application data 150, and user data 160 are stored in resident persistent memory. In some systems 110, some components of the OS 130 may be embedded as firmware in integrated memory in the processor 112. However, portions of such components may be temporarily loaded into volatile memory. In this example, the programs 140 can include, among various applications that may be installed during initial configuration by the manufacturer or distributor of the system 110, or after receipt by the user or an administrator, a general purpose user agent such as a web browser application 142 and/or a dedicated document editing and verification tool 144. Either the browser 142 or the dedicated tool 144 may be used to implement the examples described here.

Implementation using a browser 142 provides, among other advantages, improved mobility and portability on the part of users, who may be able to access the server system providing various services such as validation, mentioned above, from any suitable client data processing system 110 without requiring installation of specialized software aside from scripts and other code downloaded by the browser. On the other hand, a dedicated tool 144 provides developers with greater control over the operation of the tool on the client system 110 without requiring compatibility with current web standards. The benefits of either type of implementation will be understood by those skilled in the art. While the examples described here are described in the context of implementation in a browser, it will also be understood that this context is not intended to be limiting. In any event, it is contemplated that in browser implementations, these examples may conform to known standards for the structure and presentation of content, in particular HTML5, published by the World Wide Web Consortium (W3C) at w3.org. In addition, these examples may comply with companion and predecessor standards and specification, including without limitation HTML 4.01, XHTML 1.0 and 2.0, DOM Levels 1 through 3, and CSS Levels 1 through 3 and Level 4 modules, also published by the World Wide Web Consortium (W3C) at w3.org. Many standards are under revision or may be replaced in future, and it is expected that the examples described herein will be implementable under successor or replacement standards. Resources used in these examples may include or be associated with elements such as scripts written in JavaScript™ published by the Mozilla Foundation, Mountain View, Calif., www.mozilla.org (trademark owned by Oracle Corporation, Redwood Shores, Calif.) or in other scripting languages designed to enable programmatic access to computational objects within a host environment; Adobe Flash and Flex technologies from Adobe Systems Incorporated, San Jose, Calif.; video files in any one of various compatible formats, including Flash, Quicktime, MPEG and in particular MPEG-4; dynamic HTML technology, widgets, modules, code snippets, and the like, which may be delivered together with documents and webpages to the client system 110, or which alternatively may be downloadable separately by the client system 110, progressively downloaded, or streamed from a server.

The examples described herein may be implemented using one or more of the foregoing technologies and other combinations of technologies. Further, the resources may be executed in browser, microbrowser and browser widget environments implemented using various known layout engines including, without limitation, WebKit (available at webkit.org), Gecko (Mozilla Foundation), Trident (Microsoft Corporation, Redmond, Wash.), Presto (Opera Software ASA, Oslo, Norway) and the like designed for various runtime environments including Java™ (Oracle Corporation, Redwood Shores Calif.), OSX™ and iOS™ (Apple Inc., Cupertino Calif.), and Windows™ (Microsoft Corporation), among others. Accordingly, the browser may be provided with one or more plug-in modules adapted for processing and rendering ancillary items, such as plug-ins for rendering Flash content. Suitable browsers that are currently in widespread usage include Google Chrome™, available from Google Inc., Mountain View, Calif.; Mozilla Firefox™, from Mozilla Foundation and Mozilla Corporation, Mountain View, Calif.; Internet Explorer™, from Microsoft Corporation; and Safari™, from Apple Inc.

The relevant environment need not be restricted to a browser environment; for example, other runtime environments designed for implementation of rich media and Internet applications may be used, such as Adobe Integrated Runtime (AIR)™, also from Adobe Systems Incorporated. The selection and implementation of suitable existing and future structural or presentation standards, various elements, scripting or programming languages and their extensions, browser and runtime environments and the like, will be known to those of skill in the art.

Application data 150, including data stored by the browser 142 or dedicated tool 144, may be stored in persistent memory of the data processing system 110, as mentioned above. The data may be stored on a storage device 116, or may be stored volatile memory instead. Allocation of local storage to applications may be managed by the OS 130. In the case where the examples herein are implemented using a browser 182, the application data may be stored as an HTML local storage object, as defined in HTML5. User data 160, which can include information intended for longer term storage (i.e., longer than an individual application or browser session), such as contacts, message stores, word processing files, and the like, may be stored in resident persistent memory or on a storage device 116. Permission to access local application storage or user data may be limited to the application owning or creating the data, although permissions may be configured differently so that other applications or functions executing on the device have access to data objects created by other applications.

The data processing system 110 is provided with user or sensor input devices 118. User input devices can include a touch and/or pointing device, such as a touchscreen, touchpad, mouse, or trackball; a keyboard; security peripherals such as a biometric scanner; and multimedia input devices, such as cameras or microphones. The system 110 may also have environmental or contextual input devices such as an orientation or inertial navigation sensor (particularly in the case of a touchscreen device), ambient light sensor, or a global positioning system (GPS) or other location detection module. The system 110 can also include one or more output devices 120, including in particular a display screen, which may be integrated in the chassis of the data processing system 110, or else provided as a peripheral device. The system 110 may be configured to output data to an external monitor or panel, tablet, television screen, projector, or virtual retinal display, via a data port or transmitter, such as a Bluetooth® transceiver, USB port, HDMI port, DVI port, and the like. The data port or transmitter may be one of the communication subsystems 122 illustrated in FIG. 2. Graphics data to be delivered to the display screen is either processed by the processor 112, or else by a dedicated graphics processing unit, not included in FIG. 2. Other output devices include speakers, and haptics modules.

Not all of these suggested input or output devices are required, and many may be omitted. For instance, where the primary user interface of the system 110 is a touchscreen, a physical keyboard may be omitted altogether.

Communication functions, including data and optionally voice communications, are performed through one or more communication subsystems 122 in communication with the processor 112. Other functional components used to accomplish communication functions, such as antennae, decoders, oscillators, digital signal processors, and the like, may be considered to be part of these subsystems. Wireless communication subsystems are used to exchange data with wireless networks or other wireless devices in accordance with one or more wireless communications standards. New wireless standards are still being defined, but it is believed that they will have similarities to any network or communication behavior described herein, and the examples described here are intended to be used with any suitable standards that are developed in the future. The wireless link connecting the communication subsystems may operate over one or more different radiofrequency (RF) channels according to defined protocols, such as wireless LAN (e.g., one or more of the 802.11™ family of standards), near-field communication, Bluetooth® and the like. The particular design of a communication subsystem is dependent on the communication network 410 with which it is intended to operate. The communication subsystems 122 may include adaptors for use with wired connections as well.

It will be understood by those skilled in the art that the components illustrated in FIG. 2 are merely representative of particular aspects of the data processing system 110, and that other components that are typically included in such a device have been excluded in the drawings and this description only for succinctness. Furthermore, those skilled in the art will understand that the system 110 may be successfully used with the various examples described herein even when some components described in relation to FIG. 2 are omitted. FIG. 2 illustrates in particular one additional peripheral for use with the data processing system 110, a scanner 165. This equipment is optional, but is noted as a particular optional peripheral for the system 110 since the example documents discussed herein may be initially obtained from printed documents, then digitized and converted either at the client system 110 or server system.

Turning to FIGS. 3 and 4, select components of a server data processing system 200 are illustrated. Again, it will be appreciated by those skilled in the art that these components are merely representative, and that some of these components may be omitted or substituted while still achieving successful operation of the embodiments and examples described herein. In FIG. 3, components similar to those of the client data processing system 100 are illustrated, including one or more processors 210, memory 220, storage devices 230, input and output devices 240, 250 respectively, and communication subsystems 260. The appropriate selection of components for a server system 200 will be known to those skilled in the art. While the server system 200 may include local storage devices 230, data processed or managed by the server may be stored remotely from the server system 200, for example on a file server, not illustrated.

FIG. 4 illustrates component of the server system 200 from a functional perspective. The system 200 may be implemented on multiple data processing devices, and not merely one. The system 200 may include a communications interface module 310, which brokers communication with other systems or services, as well as the client system 110. The communications interface may include an HTTP server, where the client system 110 accesses the server system 200 using a web browser. The system 200 can also include an authentication service 320 for authenticating users and granting access to the functions provided by the server system 200, and a conversion or parsing service 330 which converts received documents to a standardized structured document format, such as HTML. The conversion service 330 may be optional in the data processing system 200, since not every document may require conversion. The conversion service 330 may also be operated outside the domain of the data processing system 200, and by a third party; for example, a third party conversion service may be used for those documents that will require conversion.

The server system 200 also includes a formatting module 340, which is used to normalize the formatting of converted or uploaded documents. A validation module 350 operates to carry out validation tasks, such as data conformity and consistency checks, on document content. Both the formatting module 340 and validation module 350 retrieve template data, validation criteria, and/or rule sets from a data store 380 to carry out their functions, and store updated data that they create (e.g., formatted documents, updated state information) in a document and state data store 390. The system 200 also includes an editing module 360 and a rollback or backup module 370, which access copies of the document or portions thereof stored in the data store 390. The editing module 360 implements editing instructions received from the client system 110 on the document, and the rollback module 370 permits the user to revert the state and content of the document to an earlier stage in the editing process.

Figure 5:
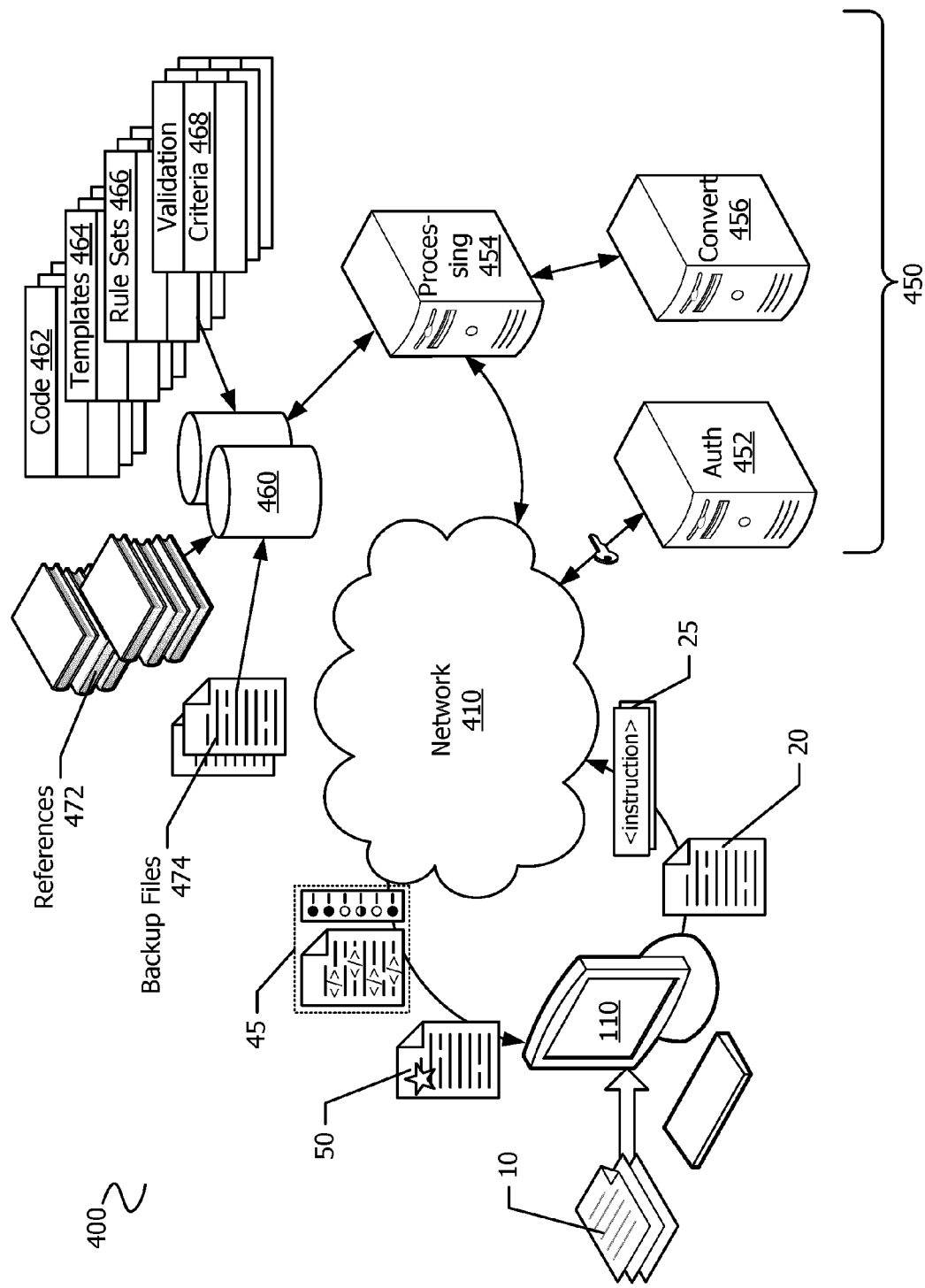
FIG. 5 is an illustration of a data processing environment including client and server systems.

The client and server data processing systems 110, 200 may be employed in a data processing environment 400 such as that illustrated in FIG. 5. This figure illustrates one possible network topology for use in the environment 400, and is by no means limiting. In this example, the client data processing system 110 communicates with the server data processing system 450 over a wide area network 410, such as the Internet. The network 410 need not be the Internet, or a wide area network; the network 410 may be public or private, wide or local, fixed or wireless. It is expected that a common implementation will, however, be over the Internet or a wide area network, in view of the current popularity of cloud-based services. However, this is by no means the only implementation possible, or the only implementation contemplated herein. In many examples, the client system 110 and the server system 200 or 450 may be physically and geographically removed from one another. In other examples, however, the two systems may be provided at the same physical location, for instance in communication over a local area network. Either way, the two systems may be considered either physically or logically "remote" from one another.

In another example, the client system 110 and the functions of the server system 200 are integrated at a single site, for instance within the client system 110. In other words, the formatting 340, validation 350, editing, 360 and rollback 370 modules illustrated in FIG. 4 may be implemented by the client system 110. In that case, the communications interface 310 and/or authentication service 320 may not be required. As will be apparent from discussion below, however, even when a client-server implementation is used, certain validation and editing functions may be carried out at the client system 110, even though other validation and editing functions are carried out at the server system 450. And, as noted above, the conversion service 330 may be provided by a third party.

The components of the server system 450 and/or the client data processing system 110 may be implemented on separate data processing devices, and thus each of these components may be considered to be logically and/or geographically "remote" from one another. In the environment 400 illustrated in FIG. 5, the authentication service 452, conversion service 456, main processing server 454, and data repository 460 are illustrated as discrete server implementations; they may be located remote from one another, rather than integrated into a single server computer. However, two or more of these functions may be integrated into a single server. Also, as mentioned above, the conversion service 456 may be implemented by a third party, in which case it may not be considered part of the server system 450. The authentication service may also be optional, and excluded from the server system 450. The data repository 460 may comprise one or more file servers, or may be the main processing server 454's storage device. The data repository 460 stores code 462, template content 464, rule sets 466, and validation criteria 468 for use in processing documents. The data repository 460 can also include reference text data 472, which can include information from reference or authoritative texts, and third-party data uploaded to the server 454 for use in comparative analysis or data consistency validation. The data repository 460 can also include backup files 474, for example for use by the rollback module 370. In addition, a copy of the document currently being processed may be stored in the data repository 460, or else in local storage of the main server 454.

The automated document processing carried out by the data processing environment 400 may include a number of stages, such as initial document loading and conversion; processing and alteration of the document to embed tasks, and delivery of the document and optionally accompanying presentation code to the client system 110; rendering and presentation of the altered document at the client system; server-side validation and automated revision; client-side validation and editing; rollback; reference queries; benchmarking; report generation; and finalization and delivery of a final document. Not all stages may be implemented in an analysis/review cycle for a given document.

Figure 6:
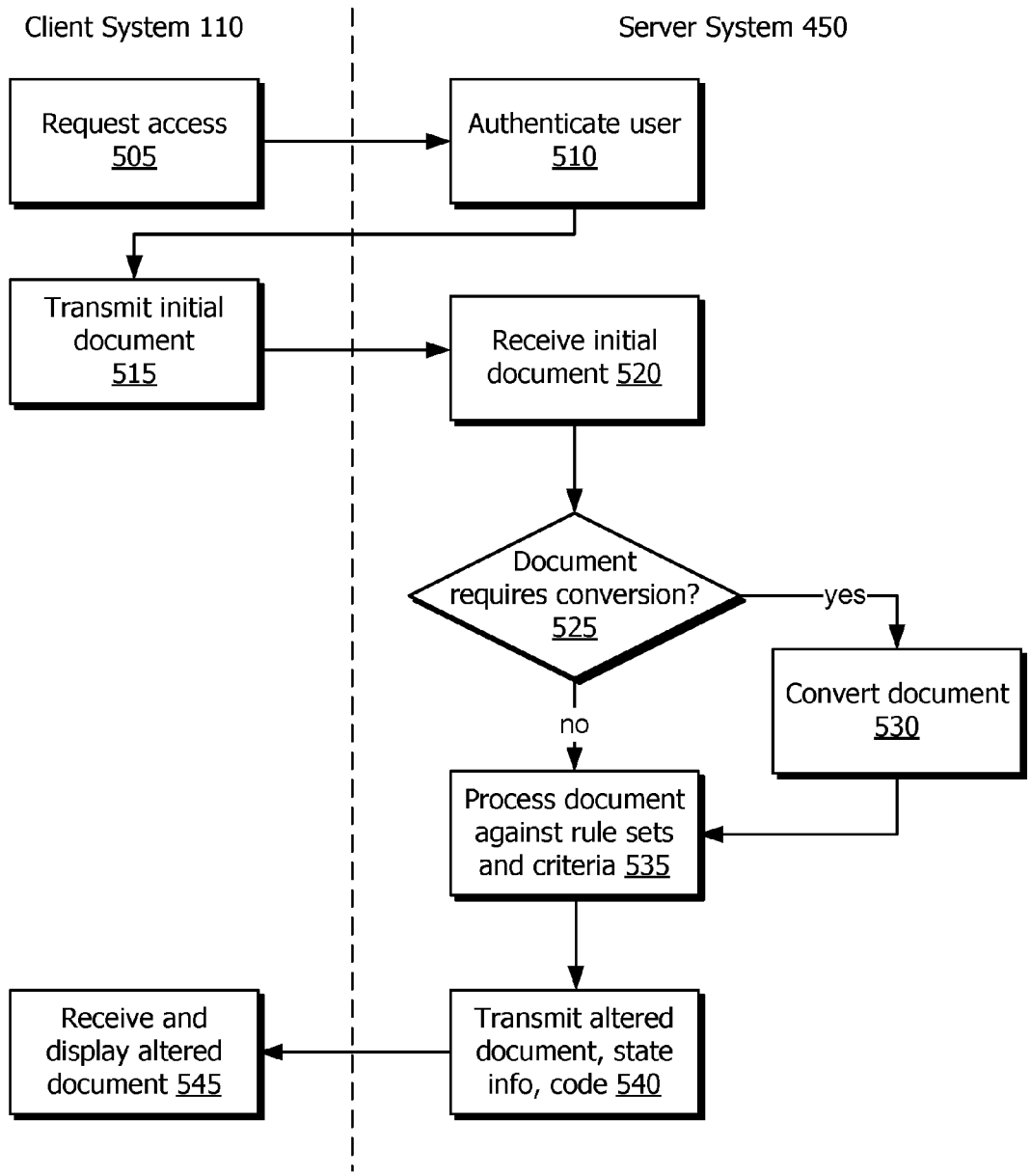
FIG. 6 is a flowchart illustrating an overview of initial processing of a document by the server system.

FIG. 6 provides an overview of the initial loading, conversion, processing, alteration, and delivery of the document and code to a client system 110 by the environment 400 of FIG. 5. At 505, the client system 110 initiates a request for access to the server system 450. The authentication service 452 governs access by the user at the client data processing system 100 to the server system 450. For example, where a browser application executing at the client system 110 is used to access the server system 450, the browser sends an initial authentication request, and authentication may be carried out by the authentication service 452 at 510 using an appropriate authentication method. The authentication method may involve single- or multiple factor authentication; for instance, the user may be provisioned with a username and password to use as credentials for authentication, and in addition to this, is optionally provided with a physical or digital token bearing additional authentication data (e.g., a digital certificate) for use in authentication. The user may be provided with an account at the server system 450 which, in some embodiments, is allocated persistent storage in a data store of the server system 450 for storing data such as the documents 20 and revised versions of the document, as well as further reference data as discussed below.

Once granted access, the user at the client system 110 may upload one or more documents 20 for processing to the server system 450 at 515. The documents are uploaded in a digital form. In some cases, the digital version of the document 20 may be generated from a non-digital (e.g., paper) originating version 10 of the document, as indicated in FIG. 5. A printed version of the document may be digitized locally at the client system 110 site, for instance using the scanner 165 illustrated in FIG. 2. Thus, the document 20 that is initially transmitted to the server system 450 at 515 may be an electronic file comprising document content (text, images, tables, etc.) in an open or proprietary document format, such as a word processing or text file format (e.g., Microsoft Word™ format; OpenDocument™ text format; Portable Document Format; Rich Text Format; plain text), or a webpage or text file in markup format (e.g. HTML or other markup format). In some cases the document content may be contained in image files as a result of digitization, and will require optical character recognition (OCR), which may be implemented at either the client system 110 or the server system 450, or as part of the conversion process. In other cases, the document is not uploaded at 515, but rather loaded from a data store at the server system 450 or obtained from another remote data store, not illustrated, over the network 410. For example, rather than selecting a document for uploading to the server system 450, the user may instead identify a document location by uniform resource identifier (URI). In some implementations, however, users may prefer that no permanent or non-transient copies of the user's documents are stored at the server for security and confidentiality reasons. In that case, the document would not be retrieved from a data store at the server system 450; instead, the user may be required to upload the document or provide a document location at the beginning of each working session, and download the edited or validated version of the document for local storage at the end of each session.

The document 20 is received by the server system 450 at 520. A determination is made whether the document requires conversion to a different format. In these examples, processing carried out by the processing server 454 is carried out on an HTML version of the document 20, and once processed, the document is provided in HTML format to the client system 110. Thus, when the document 20 is received, at 525 a determination is made whether the document requires conversion to HTML. Where HTML format is not used by the application executing at the client system 110—for instance, when a dedicated tool 184 uses a proprietary or other type of document format—then conversion to another type of format may be required. It should be noted that while the examples described here are described using HTML notation and format, the embodiments described herein need not be so limited; other document formats may be used in place of HTML. When conversion is required, the conversion is carried out 530 by the conversion service 456, which as noted above may be included as part of the server system 450. The conversion service may carry out any required OCR in order to present textual document content in text form. Suitable conversion services or modules will be known to those skilled in the art. An example of a Word document to HTML converter is the built-in function of Microsoft Word, and an example of PDF to HTML conversion is the BCL easyConverter SDK 4 Word/HTML converter, from BCL Technologies, San Jose, Calif.

The HTML document, either provided by the client system 110 in this format, or converted from another format by the conversion service 456, is processed at 535 by the processing server 454 to normalize the formatting of the document and to identify certain prescribed elements in the document in accordance with a corresponding framework identified for the document. A framework includes, in these examples, optional templates 464, rule sets 466, and validation criteria 468 defined in advance for the document. A "prescribed element" is contained within one or more content portions of a document. As will be appreciated from the discussion below, a "content portion" of a document is an atomic element or unit of content within the document. Each content portion may be identified by pattern or structural feature. Examples of identification by pattern include defining a content portion as the content filling a single page of the original document, if converted from a paginated document; and defining a content portion as each portion of the document consisting of a title or heading-like content followed by one or multiple contiguous content elements sharing common attributes, such as a heading and its following paragraphs up to the next heading. Examples of identification by structural feature include defining each content portion as the content of a single <div> element in an HTML document, or those <div> elements that have a particular parent-child relationship with other <div> elements; and defining each content portion as a single atomic HTML element or other atomic structural or programmatic element of the document, such as a heading, paragraph, image, and the like.

A "prescribed" element or other element of the document, in this context, is not necessarily a structural element (like an HTML element), but rather comprises a unit of substantive content within the document or that is intended for inclusion in the document. Such units of substantive content may be defined by subject or theme; for instance, a unit may include one or more headings, paragraphs, tables, images, and/or footnotes or other references pertaining to a particular category or subcategory of information. Substantive content need not be literary in nature; it may include one or more sets of data, charts, images, and graphs (for example, as may be presented in a technical, scientific, or environmental report). A prescribed element comprises a unit predefined for a document type. For example, a particular type of document may be expected to include information about a particular subject, or a table contain certain data, and thus that information would form part or all of a prescribed element. A prescribed element may contain sub-elements; for instance, a complete prescribed element may include a particular title or heading, together with a table or paragraph of content.

In addition, the state of each of a set of prescribed elements predefined for the document is determined. This processing is used to identify tasks associated with the document. Identifying code associated with at least some of the identified tasks is inserted into the document, and document thus altered, together with state information and additional presentation code, are provided to the client system at 540 as indicated in FIG. 5 by data 45. At 545, the client system 110 receives and renders the altered document for presentation. The rendering can include execution of other processing to identify additional tasks at the client side. After receipt at the client system 110, as discussed further below, various tasks identified in the document and/or editing are carried out based on instructions and other data 25 sent from the client system 110 to the server system 450, resulting in changes to the document, which are reflected in an updated version of the document rendered and displayed at the client system 110. Ultimately, a final version of the document 50 is produced and transmitted back to the client system 110. The final document 50 may be provided in HTML format, or converted to the original format of the document 20 received from the client system 110 with any presentation code inserted earlier by the server removed.

Figure 7:
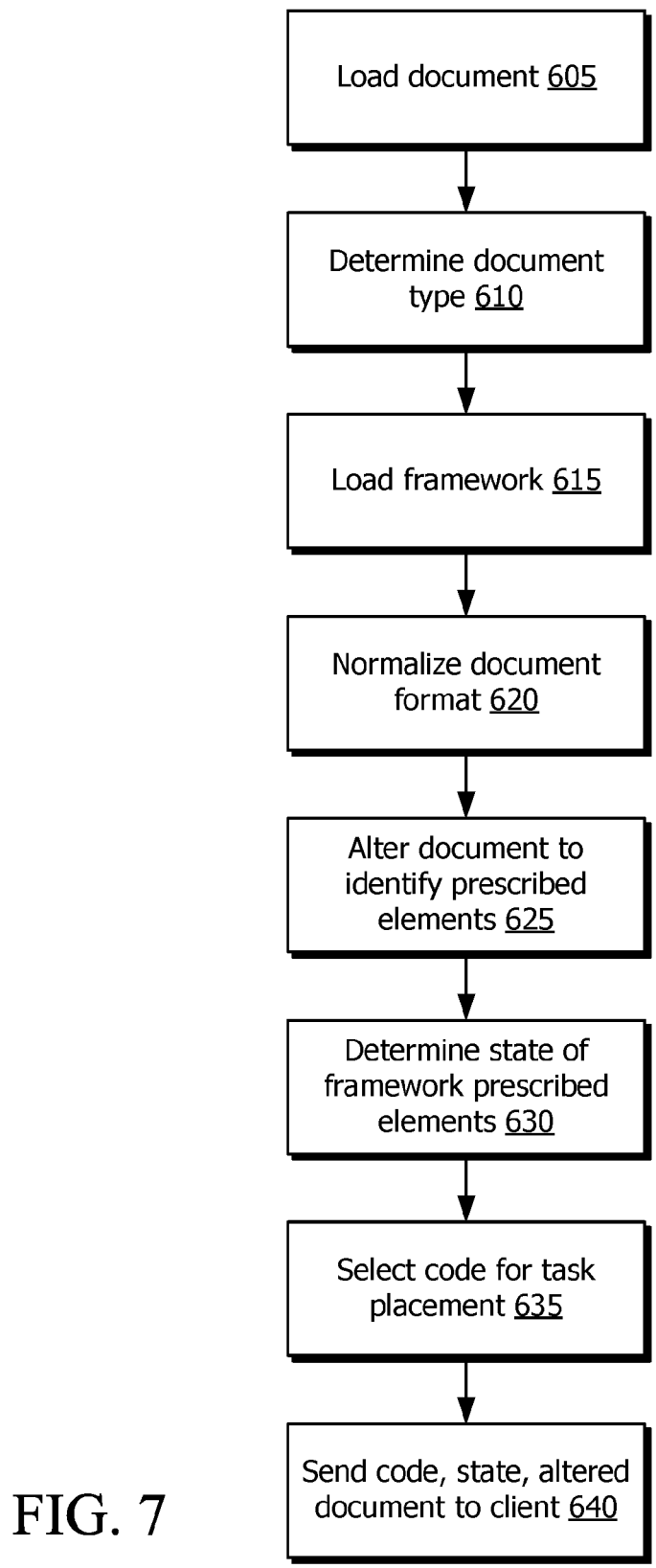
FIG. 7 is a flowchart illustrating processing and alteration of a document for delivery to the client system.

FIG. 7 further breaks down the document processing functions carried out on the document once converted to HTML. At 605, the processing server 454 loads the document (converted or originally provided in HTML format). At 610, a determination of document type or kind is made. The document type may be identified by the user at the client system 110 at the time the document is initially uploaded, or else automatically determined by the server system 450 based on a comparison of keywords or document structure to keywords or structure information in various stored templates or frameworks. For instance, in the case of corporate disclosure documents, the type may be identified as a "proxy circular", "annual information form", and so forth. Based on the identification of document type, the server 454 loads information from a corresponding framework 615. A framework comprises an identification of predefined prescribed elements for the document type, various rules and validation criteria for determining conformity of document content to prescribed elements, and an identification of tasks associated with the document type and/or prescribed elements. Table 1 illustrates example content of a framework for a specific document type. The tabular form presented below does not necessarily represent the data structure in which the framework information is stored:

TABLE 1

Example framework information for a document type.
Framework 1

| Document Type | | <type id/name> | | |
|---|---|---|---|---|
| Prescribed Element | Attribute/Type | Validator(s) | Rule(s) | Task(s) |
| <identifier 1> | <attribute 1> | <v_set 1> | <r_set 1> | <t_set 1> |
| <identifier 2> | <attribute 2> | <v_set 2> | <r_set 2> | <t_set 2> |
| <identifier 3> | <attribute 3> | <v_set 3> | <r_set 3> | <t_set 3> |
| <identifier 4> | <attribute 4> | <v_set 4> | <r_set 4> | <t_set 4> |

Thus, a framework is defined for a given document type or kind ("type id/name"), and defines a set of prescribed elements and any sub-elements of the prescribed elements (all named in this example as "identifier 1" through "identifier 4") for the document. Prescribed elements may be predefined for the document according to any authoritative text or guideline applicable to the document. For example, guidelines for the document may require or recommend inclusion of certain kinds of substantive content (e.g., compensation data, biographical information). Each prescribed element and any sub-element thereof is defined according to an attribute or element type, one or more validation criteria ("Validator(s)") and one or more rules, and is associated with one or more tasks. In Table 1, the first prescribed element or sub-element ("identifier 1") is defined as having an attribute or element type of "attribute 1", and is associated with a set of validation criteria "v_set 1" and a set of rules "r_set 1", and is further associated with a set of tasks "t_set 1". The attribute or element type may be an HTML element or attribute; for instance, a given prescribed element may be defined as an HTML heading or table, or a particular level of heading. The designation of an attribute or element type is used to facilitate validation and correlation of tasks to document content, as will be seen below.

Validation criteria can include keywords or structural requirements used to determine whether a given prescribed element is present, missing, or incomplete in the document content. For instance, a prescribed element may comprise a particular title or heading in the document, in which case the validation criteria can include specific keywords in the particular title, or acceptable synonyms. Rules can include requirements for presence of exact keywords or synonyms, and in some cases a requirement that a particular keyword or synonym not be present in the vicinity of another keyword or synonym in a given content portion (e.g., for a determination that a particular portion is an "indoor air emissions" prescribed element, a rule may require that the word "emissions" be present and the word "outdoor" or a synonym like "outside" or "external" not be within a specific range of words, lines, or sentences of "emissions"). As another example, a prescribed element may comprise multiple sub-elements, so the validation criteria may include requirements for location or adjacency in the document; for example, a prescribed element that is defined as comprising a title and tabulated data may be considered present and complete in the document if a particular type of HTML element that contains specified keywords (such as a title with a specific phrase) is found (the first sub-element) and is present in the document adjacent or substantially adjacent to another HTML element, such as a table structure (the second sub-element) that also meets its validation criteria. On the other hand, that prescribed element may be determined to be present but incomplete if the first sub-element is found but not the second, or vice versa. Thus, the framework may contain multiple validation criteria and rules for a given prescribed element. Validation criteria may be established by subject matter experts for the given document type, or by automated analysis of exemplar documents. Keyword synonyms may be detected by monitoring user word choices.

A prescribed element may also be associated with multiple types of tasks. In the framework, the validation criteria, rules, and tasks may be represented as pointers to another data structure that contains the actual criteria, rules, and task definitions. In some cases, different prescribed elements may have common validators, rules, or tasks, so the relationship among prescribed elements and these characteristics may be a many-to-many relationship.

Returning to FIG. 7, at 620 the existing document formatting is "normalized" according to predefined rules. As will be discussed further below, conversion of the document to HTML format (or whatever other standardized format), due to design choices made by the original document author, may result in inconsistencies or anomalies when the HTML version of the document is generated. The processing server 454 implements formatting rules to reduce the instance of inconsistencies or anomalies to reduce the amount of manual editing that might otherwise have to be undertaken by the user.

At 625, the processing server 454 identifies prescribed elements present in the document according to the selected framework, and inserts identifying code in the document for each located prescribed element. The state of each prescribed element in the framework (including those not present) is determined at 630, and as a result of the identification of prescribed elements and state determination, appropriate code is selected for the document at 635 in order to embed references to corresponding tasks in the document itself, in appropriate presentation locations when the document is rendered for presentation at the client system 110. The code, state information, and the altered document 45 are then sent to the client system at 640. The code and/or state information may be embedded in the document to be sent to the client system 110, or may be delivered separately. From the foregoing description, it will be appreciated by those skilled in the art that the identification of prescribed elements, and their state, does not require prior semantic tagging or document preparation by the user; the document supplied by the user may be substantially unstructured (e.g., plain text or a text-based document) without parts of the document or parts of speech specially identified. Moreover, there is no need for document preparation by the user to identify the locations for embedding the selected code to identify the types of tasks to be included in the document.

It will be appreciated by those skilled in the art that certain stages or steps described herein may be implemented in different orders than represented in the accompanying figures, or in parallel where issues of dependency or inheritance do not impact the outcome of the steps. For instance, in some cases the normalization of the document format 620 may occur prior to loading the document type-specific framework at 615, where normalization involves rules and criteria that apply to multiple document types.

Figure 8:
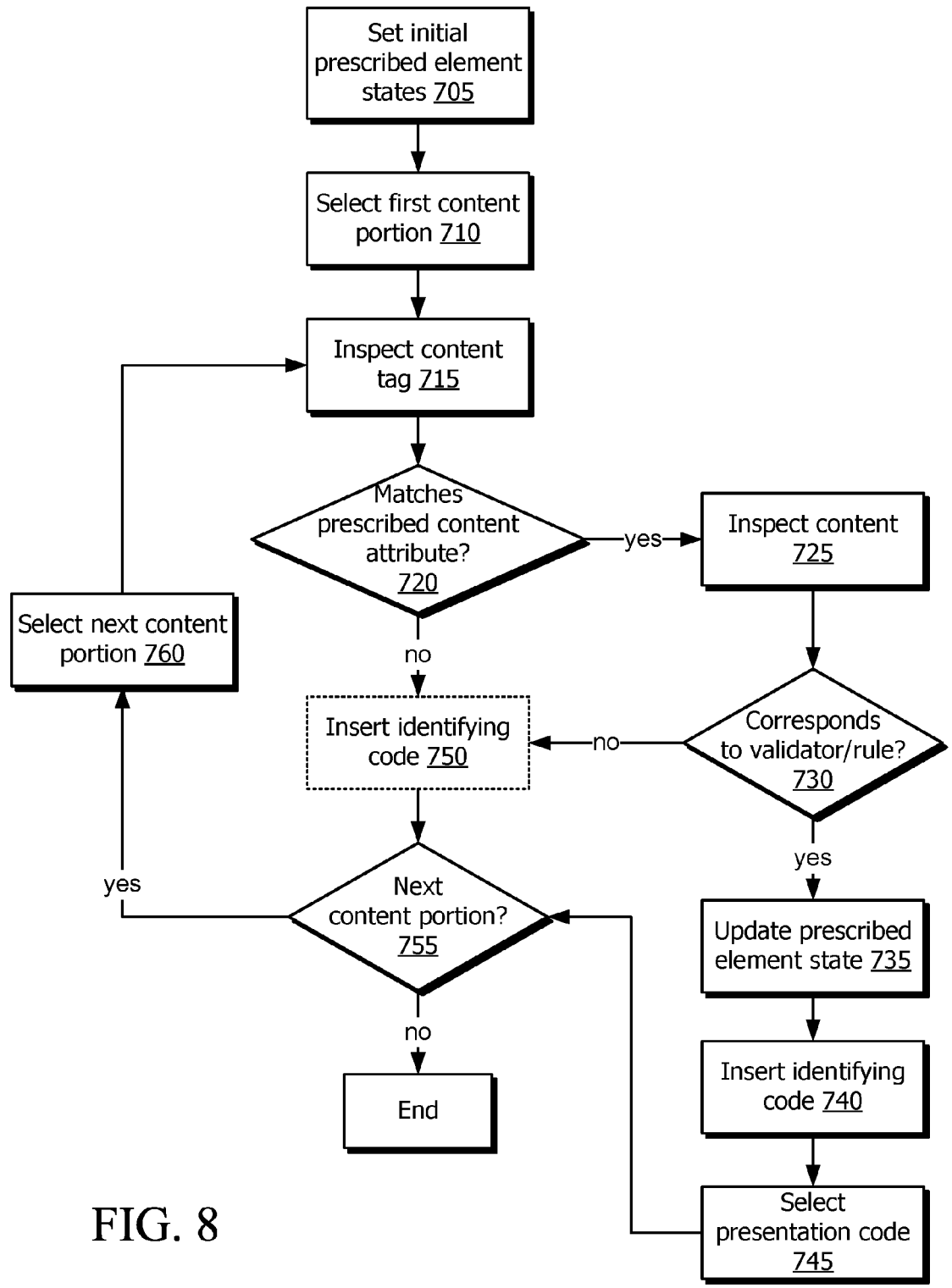
FIG. 8 is a flowchart providing further details of select aspects of the process of FIG. 7.

FIG. 8 illustrates further detail of the initial processing of the document generally represented by blocks 625-635 of FIG. 7. Once the document and framework are loaded at the processing server 454, the server sets initial values for the state of each prescribed element in the framework 705. The initial value may represent a presence state in the document, such as missing, complete, or incomplete. An "incomplete" state may reflect the case where a prescribed element meets sufficient validation criteria to be identified as present in the document, but not complete. At the outset, the initial values are generally set to reflect that each prescribed element is not present, or missing.

At 710, a first content portion of the document is selected. The content portions may be selected in turn according to their order of occurrence in the document; for example, in an HTML document, in order of occurrence as the DOM is traversed. However, other orders of operation can be implemented; for instance, all document structural elements or content portions having a particular element type or attribute may be selected and queued for processing, and separate threads may execute to process portions of a corresponding type or attribute. In this example, once the first content portion of the document is selected, at 715 its HTML tag is inspected to determine its attribute or element type. Candidate prescribed elements or sub-elements having matching attributes or element types are then identified from the framework. If a determination is made at 720 that the content portion matches a prescribed element type or attribute in the framework, then at 725 the content of the portion is inspected and compared to the validator(s) for the prescribed element or sub-element, in accordance with the defined rules. If the content portion is determined to match a sub-element, then additional content portions (e.g., the immediately following content portions within the document) can then be inspected to locate other sub-elements of the prescribed element.

If at 730 it is determined that there is sufficient correspondence to the validator(s) defined for the prescribed element to update the state of the prescribed element to a presence indicator, then at 735 the prescribed element's state is updated. The state can include an indicator of the presence of sub-elements of the prescribed element rather than, or in addition to, an indicator of the prescribed element's overall state. As noted earlier, some prescribed elements may include validation criteria pertaining to adjacency of one sub-element to another sub-element; thus, in some cases, a prescribed element may be identified as "incomplete" or an analogous state to indicate that not all required sub-elements were located according to the validators defined for the prescribed element, while a state for the individual sub-elements of the prescribed element are set to "complete" or "missing" (or analogous states), as the case may be. In some implementations, where a content portion appears to match validators for a plurality of prescribed elements, the user may be queried for a selection of a corresponding prescribed element, or else one of the prescribed elements is automatically selected according to weightings assigned to each validator.

Note that multiple prescribed elements in a given framework may share a common element type or attribute (for example, a document may require multiple tables containing numeric data, each table fulfilling a different prescribed element); thus, the determination whether the content portion matches an element type or attribute and sufficiently corresponds to certain validators may be carried out for multiple prescribed elements in the framework, and the server will determine that the content portion corresponds to one particular prescribed element based on a comparison of the outcomes of these determinations.

Once correspondence between a content portion and a prescribed element is determined, at 740 identifying code for the prescribed element and its associated task(s) is inserted in the document, and appropriate presentation code for execution by the client system 110 (in particular, when the client system 110 employs a browser) is selected at 745. The prescribed element, its identifying code, and presentation code may be wrapped in a container or other delimiter within the document; for instance, all content determined to correspond to a prescribed element (and its sub-elements, as the case may be) may be wrapped in a <div> tag if the document is in HTML format; the identifying code can be included as an attribute within the tag. Presentation code can be provided within another structural element within the container, e.g., as a unit of HTML button code, identifying the prescribed element by its identifying code.

If, however, no correspondence between the content portion and any prescribed element in the framework is identified, then optionally at 750 identifying code for the content portion is inserted in the document (for example, an identifier of the content portion as free text, rather than a prescribed element). The process then moves on to the next content portion in the document at 755, if there is one available. If there is a next document component, it is selected at 760 and the processing resumes at 715 for this next component.

Figure 9:
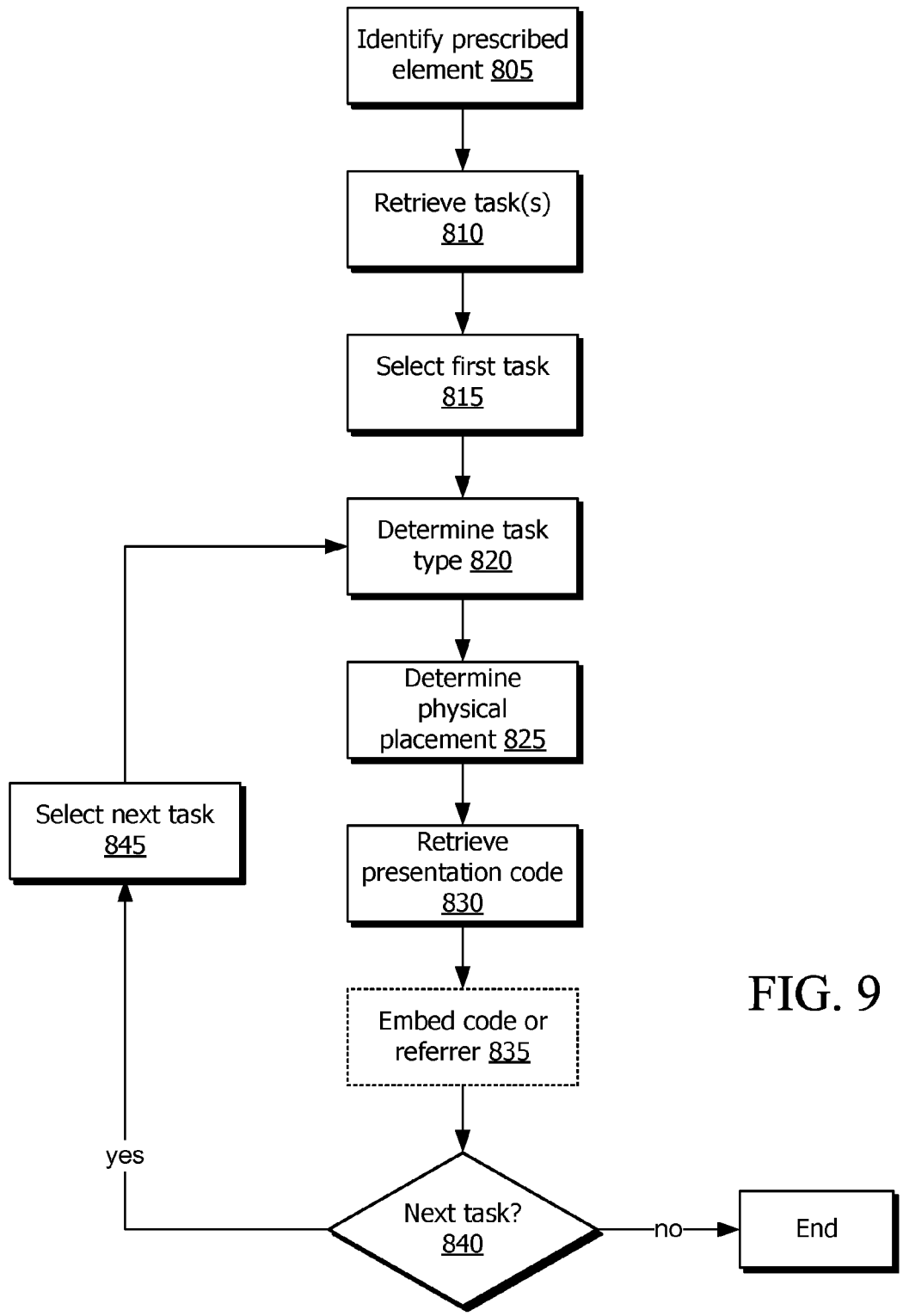
FIG. 9 is a flowchart providing further details of select aspects of the process of FIG. 8 pertaining to the insertion of code in the document.

The selection of presentation code associated with the prescribed element task(s) includes, in the case of presentation code for displayable user interface elements to be embedded in the document, a determination of the physical (graphical) placement of user interface elements within the document, such that they are rendered in visually appropriate positions when the altered document is displayed at the client system 110. FIG. 9 illustrates further detail of the presentation code selection. This process may be implemented at the same time as the processing described in FIG. 8, where the code is selected as each content portion is processed; alternatively, the presentation code selection may be implemented by a distinct process executing after the processing in FIG. 8, or in parallel with that processing. At 805, the prescribed element of a given content portion is identified, and based on the information in the framework corresponding to the document, identifying information about the task(s) associated with the prescribed element are retrieved from a data store at 810. Each task can be associated with a task "type", such as an automated validation process, a data consistency check, a reference query, etc., and with a corresponding graphical user interface element, and each type may be associated with a physical placement rule for its corresponding graphical user interface element. In the case where the document is to be prepared for enhanced accessibility at the client system—for instance, where the document needs to be compatible with aural presentation in place of or in addition to visual presentation—the placement of graphical user interface elements in this manner may be sufficient, provided sufficient informational content is inserted to permit aural rendering of the user interface elements. Thus, at 815, a first task of the set of tasks for the prescribed element is selected, and at 820 its task type is determined. Based on the task type, the placement of the user interface element associated with the task is identified at 825, and at 830 appropriate presentation code (e.g., Javascript) executable by the client to graphically render the graphical user interface element in connection with the document is retrieved from the data store and configured as necessary to reference the associated task and user interface element. The presentation code may be embedded in the document to be delivered to the client system 100 at 835, but in some cases only a reference to the presentation code may be embedded in the document, or the code may simply accompany the document when it is sent to the client system. If at 840 there is a next task associated with the prescribed element, then at 845 the next task is selected and the process repeats at 820. In this manner, presentation code for each prescribed element found in the initial document (as converted) is selected and defined for the document, and the document is altered to reference the prescribed elements and their associated tasks.

It is contemplated that specific tasks will have been defined for prescribed elements of the document, as illustrated in FIG. 9. However, tasks may also be generally associated with elements of a document other than prescribed elements. These may be tasks that generally apply to any element of the document, whether determined to be a prescribed element or otherwise. Association of tasks and insertion of presentation code or referrers for presentation code may be implemented for such other elements in a similar manner as that described in FIG. 9.

Figure 10:
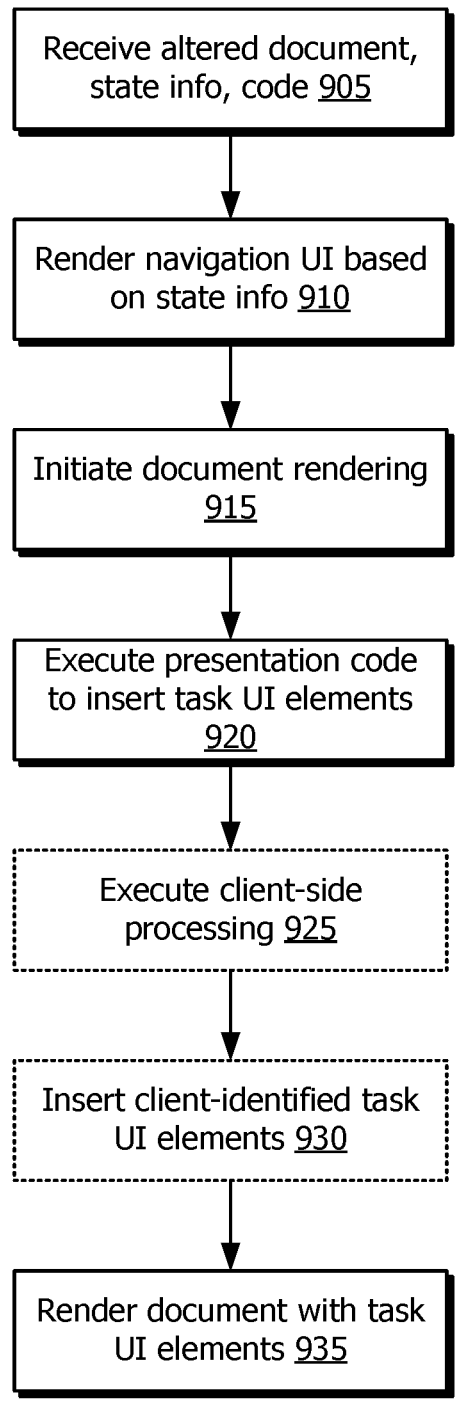
FIG. 10 is a flowchart illustrating an overview process for rendering and displaying the altered document at a client system.

Rendering and presentation at the client system 110 is illustrated in the flowchart of FIG. 10. At 905, the altered document and other data 45 are received at the client system 110. As noted earlier, the client system 110 may use a general purpose user agent such as a web browser 142, or a dedicated application 144, and it may be this component of the system 110 that implements the rendering and display steps. The client system 110 then renders the altered document and the state information and code at 910-935 for presentation, for instance using the layout engine of the browser 142 or application 144. At 910 the client system 110 may render navigation user interface elements that are based on the state information, as discussed in further detail below. Altered document rendering is then initiated at 915. Presentation code provided to the client system 110 with the altered document is executed in order to place task user interface elements in designated locations when the rendered altered document is presented at 920. Subsequently, as discussed below, the user of the client system 110 may execute the tasks associated with the various elements of the altered document, and make changes to the content that are stored locally in the client system 110 and/or remotely at the server system 200. The altered document delivered to the client system 110 thus also constitutes an editing copy of the document, which may be intermittently updated at both the client 110 and server 200 in response to executed tasks and other changes.

Optionally, the client system 110 also executes further processing at 925 to insert further task user interface elements associated with various elements or sub-elements (either prescribed or not) in the altered document. Based on the identifying codes that were inserted into the altered document (e.g., at steps 740 and 750 discussed above during server processing), further tasks are identified and presentation code or references to presentation code relating to those further tasks is injected into the altered document. Presentation code and executable scripts for executing these tasks may be stored remotely at the server system 200, or locally at the client system 110, but at this stage, the client system 110 determines whether to associate further tasks with altered document elements, and implements the association through insertion of presentation code in a manner similar to that described in FIG. 9. While this stage is illustrated as following other rendering 910, 915, 920, this client-side processing 925 may precede one or more of these other rendering steps, or in parallel. Finally, at 935, the complete altered document is rendered and displayed, together with task user interface elements.

Figure 11:
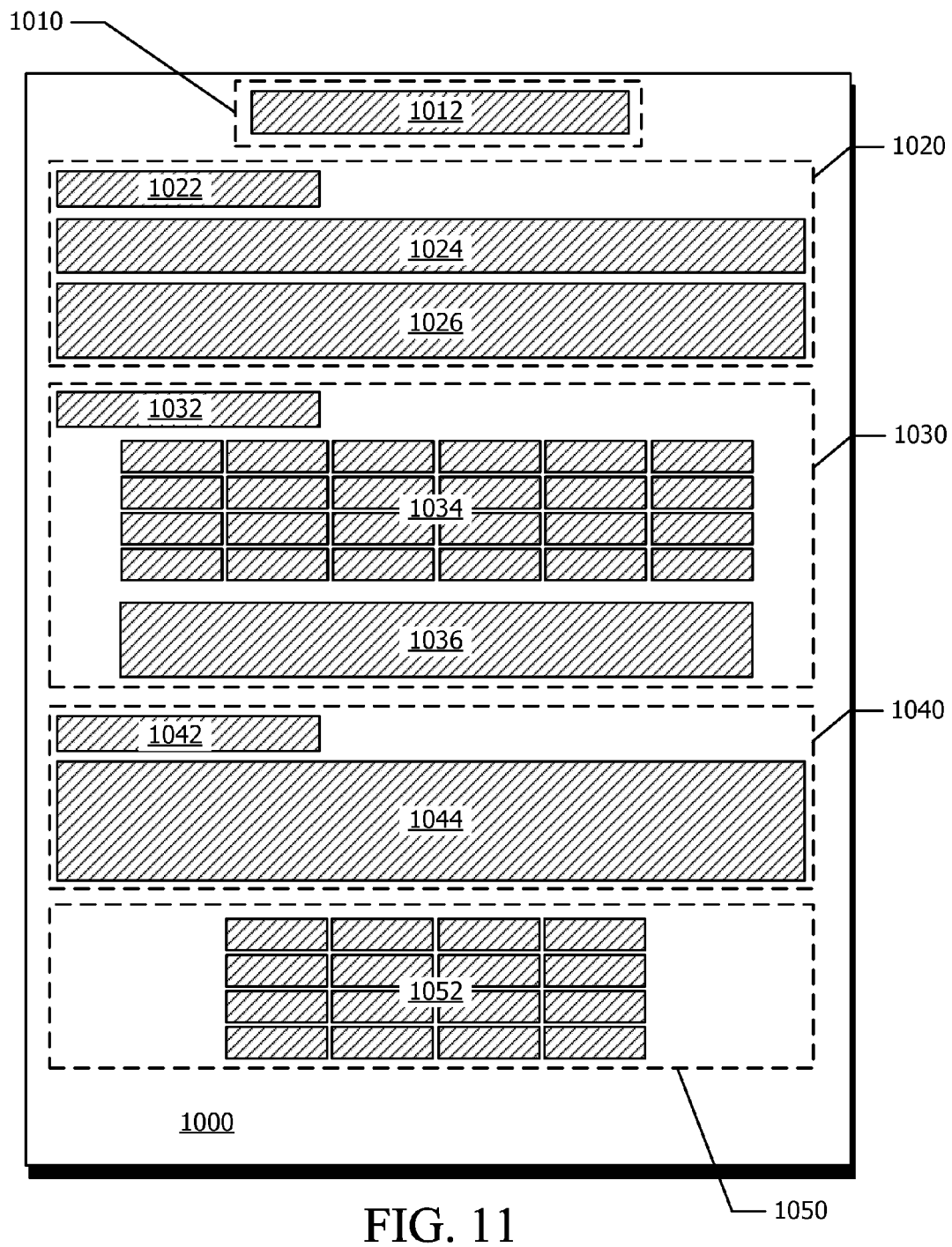
FIG. 11 is a schematic illustrating an initial physical layout of a document prior to alteration.

FIG. 11 illustrates a schematic of a document 1000 having prescribed elements identified, without insertion of code for task user interface elements. In this example document, there are multiple prescribed or non-prescribed elements 1010, 1020, 1030, 1040, 1050, comprising one or more content portions; elements 1020, 1030, and 1040 contain sub-elements. Element 1010 comprises content 1012 that may be a top-level title or heading for the document 1000, and in this example is a non-prescribed element; its presence is not required by the framework for the document type. Element 1020 comprises three content portions 1022, 1024, 1026, where content portion 1022 may be a heading and portions 1024, 1026 are paragraphs. Element 1030 comprises three content portions as well, 1032, 1034, 1036, where 1034 comprises a table or other data presented in tabular format (whether formatted in an HTML table or other tabular arrangement), and 1036 contains footnotes referencing the content of the table 1034. Element 1040 comprises a heading content portion 1042 and a paragraph content portion 1044. Finally, element 1050 comprises only a table 1052.

Figure 12:
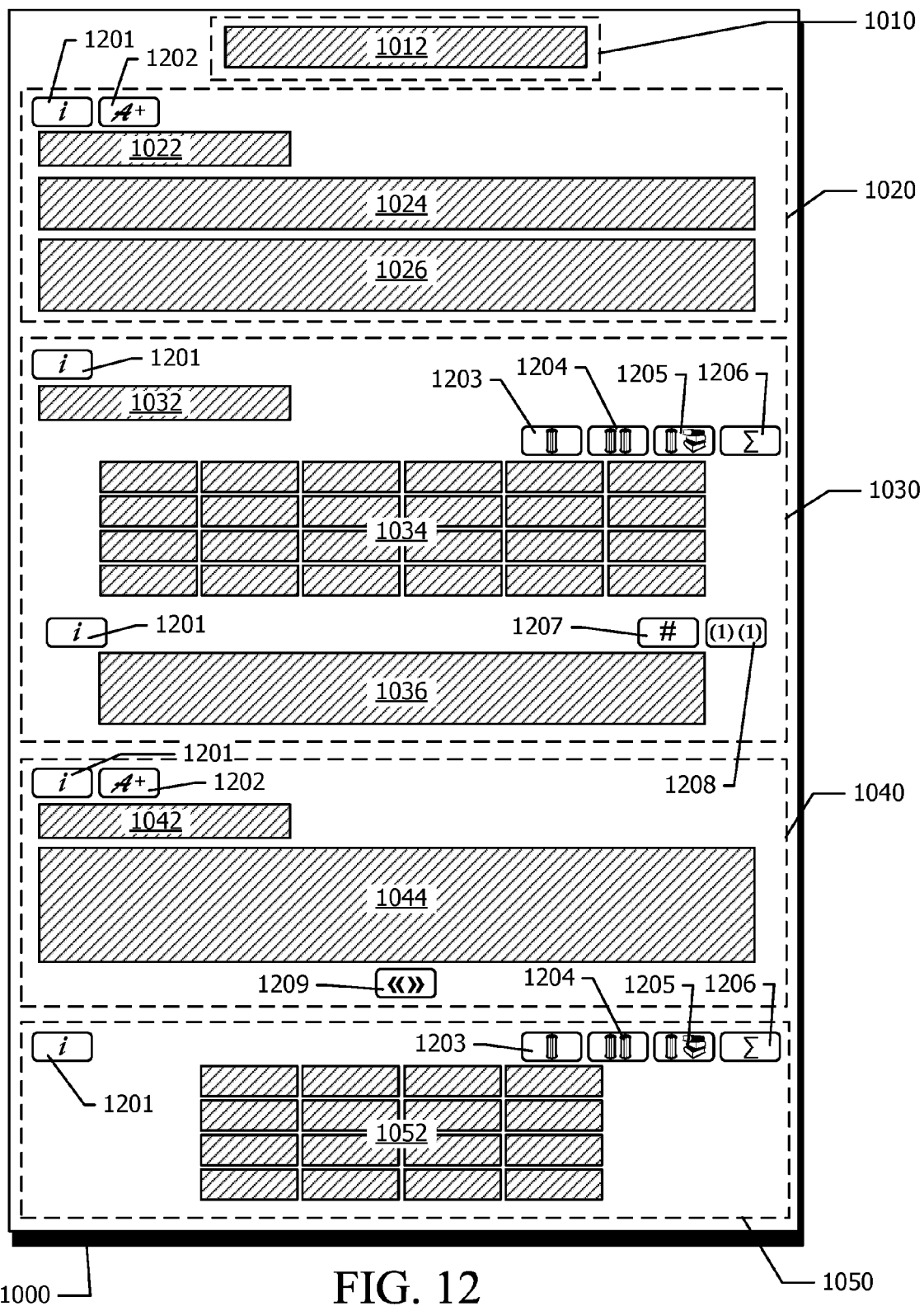
FIG. 12 is a schematic illustrating a further physical layout of the document after alteration including rendered components resulting from inserted code.

FIG. 12 illustrates a possible appearance of the document once altered to include presentation code, and rendered to display the user interface elements defined by the presentation code. Here, elements 1020, 1030, 1040, and 1050 have been identified as corresponding to prescribed elements although not necessarily complete, while element 1010 is not associated with any prescribed element. Certain tasks have been associated with the prescribed elements 1020, 1030, 1040, 1050. As can be seen in FIG. 12, additional user interface elements 1201 and in some cases 1202 have been associated with all of the prescribed elements, and in some cases with individual content portions (e.g., 1036) within a prescribed element. In this example, the user interface element 1201 is associated with a query or lookup task, which when invoked presents on-point, or relevant, reference materials pertaining to the prescribed element or sub-element. User interface element 1202 is associated with a "best example" task, which when invoked presents reference materials illustrating a best example of the content pertaining to the prescribed element. The on-point reference materials may be automatically retrieved from the server system 200 in response to invocation of the task at the client system 110. In this example, these two user interface elements 1201, 1202, being associated with informational or look-up tasks, are positioned proximate to the left edge of the corresponding prescribed element or sub-element, immediately above the content portions comprising the element.

The prescribed elements 1030 and 1050 are also associated with specific tasks pertaining to their specific content. In this non-limiting example, user interface elements 1203, 1204, 1205, and 1206 identify four different types of tasks associated with the tables 1034 and 1052. The first user interface element 1203 is associated with a first "data consistency check" task, in which columns of data in the table 1034 or 1052 are compared against other columns within the same document for consistency. Thus, for example, data in a selected column of table 1034 may be compared against a corresponding column of 1052. This type of task may be used to confirm that data in one table column or row is replicated correctly in another table column or row within the same document. The second user interface element 1204 is associated with a second "data consistency check" task, in which data in columns of the associated table are compared to data in columns of other tables retrieved from other documents. These other tables may be stored at the client system 110 or remotely at the server system 200. If not stored at the server system 200, then the server system 200 retrieves the tables from another one or more documents uploaded from the client system 110 or retrieved from another computer system. The tables can be retrieved from these documents using processing techniques similar to those used for the document altered for editing, as described earlier, to identify the tables in the document and read them into arrays in memory at the server system 200. When this second data consistency check task is invoked and the other tables are read into memory, a list of these tables can be presented to the user for selection of the appropriate table(s) and/or row(s) or column(s) for comparison to the subject associated table.

The third user interface element 1205 is associated with another form of consistency-checking task, in which the columns or headings of the associated table are compared against a reference version of the table to confirm that the types of data expected in the table are included. Finally, the fourth user interface element 1206 is a "check accuracy" task, which determines which columns or rows of the associated table are intended to represent a sum of other columns in the tables and confirms accuracy in the reported totals. This task can also identify incongruent numbers or apparent errors in the table such as empty cells, non-numeric or currency characters, and incorrect or inconsistent decimal placement.

The user interface elements for these tasks, which are used to review consistency or accuracy of the data contained in the prescribed element, are visually distinguished from the user interface elements for the informational tasks with a horizontal separation; as can be seen in FIG. 12, this second set of user interface elements are located proximate to the right of the prescribed element, immediately above the content portions comprising the element. As can be seen in prescribed element 1030, the second set of user interface elements 1203-1206 is located immediately above the table content portion, rather than above the entire prescribed element 1030, since the tasks pertain specifically to the table rather than the entire prescribed element; however, the user interface element 1201 represents a task that relates to the entire prescribed element, so it is located above all content portions associated with the prescribed element 1020, 1030, 1040, 1050.

Still further tasks may be associated with validation or consistency checks for non-tabulated data, such as the content of content portion 1036. In this example, the content portion 1036 was identified as containing footnotes or explanatory text for the preceding content portion 1034, and in this case may include reference numerals or symbols corresponding to reference numerals or symbols in the content portion 1034. An additional consistency task to confirm that the reference numerals or symbols included in the content portion 1036 match reference numerals or symbols in the immediately preceding content portion is invoked by actuating graphical user interface element 1207; user interface element 1208 invokes another consistency-checking task in which the content of a given footnote is matched against the content of a row of data or statement in the immediately preceding content portion that contains the corresponding footnote number. Again, since these are consistency checks, they are physically located proximate to the right edge of the prescribed element.

Another example of a task represented by a user interface element in the document is a "missing parts" task, indicated by user interface element 1209. This user interface element may be located in a position where a particular prescribed element was expected to appear (based on framework information for the document type), or in some other position that will be apparent to the user when the document is rendered and displayed on the client system 110. In this example, the "missing parts" user interface element 1209 is positioned in a selected location the middle of the document. The "missing parts" task may be associated with a specific prescribed element in the case where the prior processing of the document indicated that a prescribed element was present, but not complete.

As mentioned above, the rendering and positioning of the user interface elements 1201-1209 can be accomplished by the insertion of presentation code within the document itself. Table 2 illustrates example pseudocode representing the altered document structure with inserted presentation code:

TABLE 2

Example of presentation code insertion in an altered document.

```
<document>
    <prescribed_element id="012345">
        <button id="task_001" class= "task_001_class"
        data-content="dialog content"
        target="012345" />
        <button id="task_002" class= "task_002_class"
        data-content="dialog content"
        target="012345" />
        <content_portion>
        </content_portion>
        <content_portion>
        </content_portion>
    </prescribed element>
    <prescribed element id="012346">
        <button id="task_003" class= "task_003_class"
        data-content="dialog content"
        target="012346" />
        <content_portion>
        </content_portion>
    </prescribed element>
</document>
```

Here, each prescribed element is defined with an identifier (e.g., id="012345"). Each prescribed element can contain one or more content portions, and display code (e.g., <button id . . . >) for any associated tasks determined to be relevant to the prescribed element. The presentation code includes a reference to the prescribed element identifier or, in the case where the task associated with the prescribed element is designed to act on a target sub-element, the individual content portions containing sub-elements may also be tagged with identifiers and the presentation code will include a reference to the corresponding sub-element identifier. The presentation code is thus associated with a graphic element (e.g., the user interface elements 1201-1209), and with a script (stored either at the client system 110 or server system 200) executable to implement the task on the identified prescribed element or sub-element. In this way, the altered document 1000 contains the presentation code and references necessary to invoke the tasks deemed relevant to the document content, and is thus portable to other client systems implementing the client-side functions of the system 400.

Figure 13:
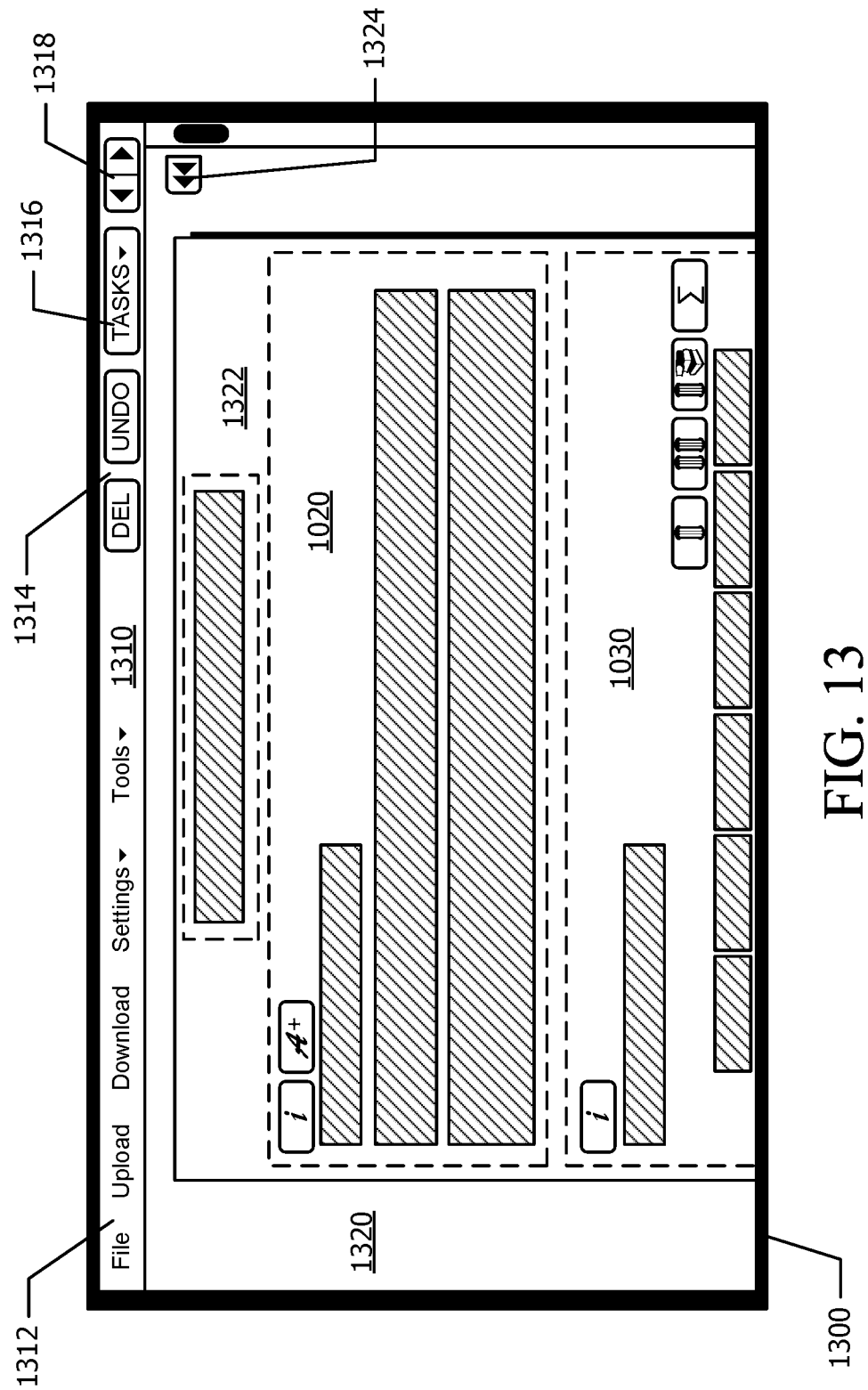
FIG. 13 is an illustration of a graphical user interface at the client system presenting the altered document.

FIG. 13 illustrates a possible graphical user interface for presenting the altered document for execution of tasks using a browser or other user agent 142 or dedicated application 144. The graphical user interface 1300 includes a menu or control region 1310 and a document display region 1320. The menu or control region 1310, in this example, includes a set of menu options 1312 for carrying out global application functions, uploading and downloading copies of documents, adjusting settings of the application, and invoking various tools or functions of the application. The region 1310 includes user interface elements 1314 for frequently-accessed actions, including a "tasks" action element 1316, and a "next/previous" control element 1318, for jumping to immediately previous or next document elements or previous/next tasks in sequence. The document display region 1320 displays all or part of the rendered altered document 1322 and permits the user to manually edit any of the document elements in the document. Additionally, a further user interface element 1324 is included to invoke an expanding (i.e., selectively displayable) menu or other user interface feature that permits the user to show or hide various features in the document, such as the various task user interface elements 1201-1209. This additional user interface feature need not be an expandable feature; it may be persistently displayed onscreen. Whether persistent or not, this user interface feature can include options selectable by the user to show and hide tasks on the display according to predetermined "viewpoints". A viewpoint, in this context, is a set of one or more tasks pertaining to a particular objective. For example, one viewpoint may be data consistency; thus all tasks directed to confirming the accuracy or consistency of data in the document would be part of that viewpoint. In the code example in Table 2 above, tasks pertaining to a particular viewpoint could be identified by the assigned "class" value (i.e., all tasks belonging to a particular viewpoint would have the same "class" value). Thus, task user interface elements can be shown or hidden in groups according to viewpoint or class, while other task user interface elements remain hidden or visible, as the case may be.

Figure 14:
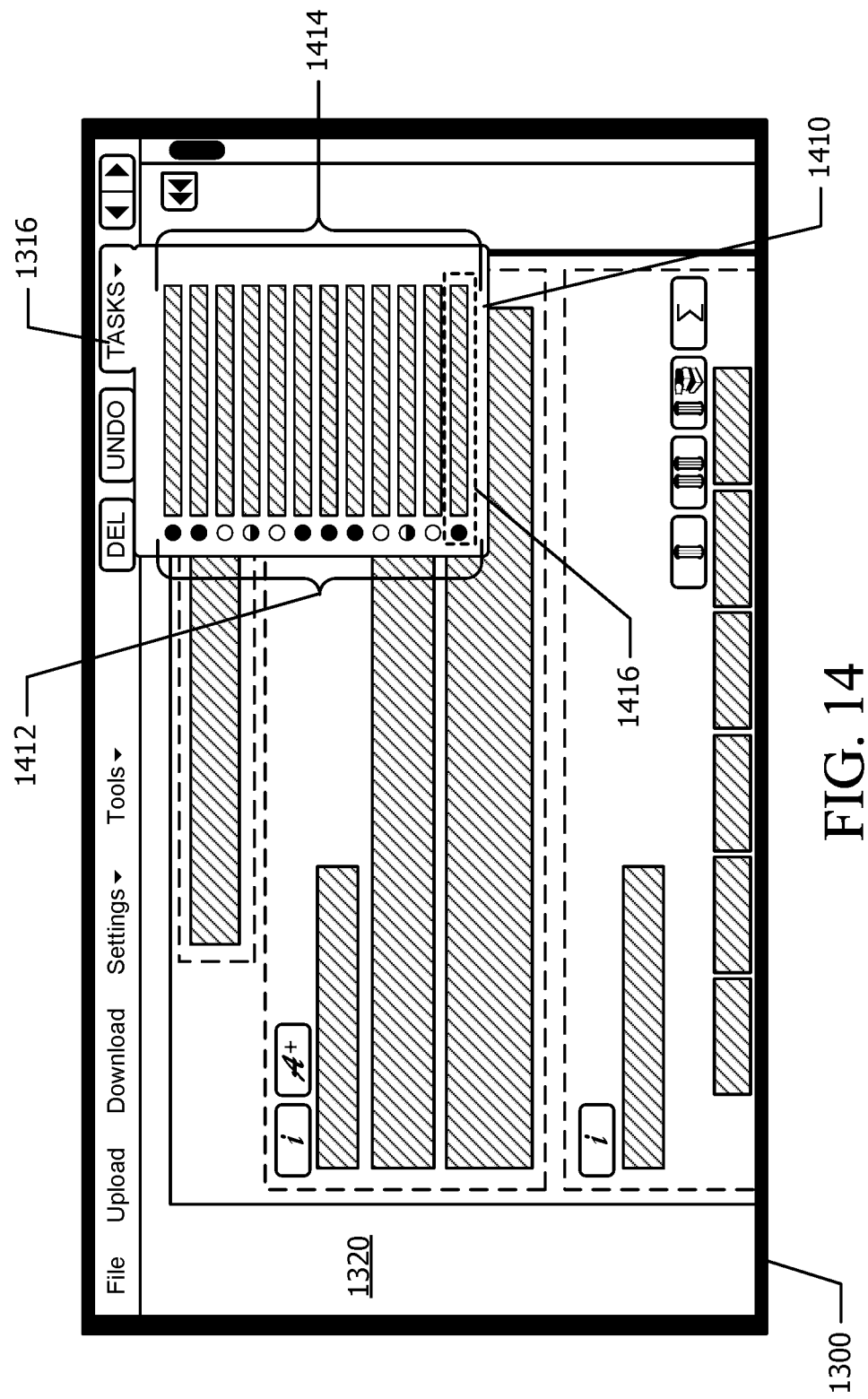
FIGS. 14 and 15 are illustrations of a graphical user interface during selection and presentation of elements of the altered document.
Figure 15:
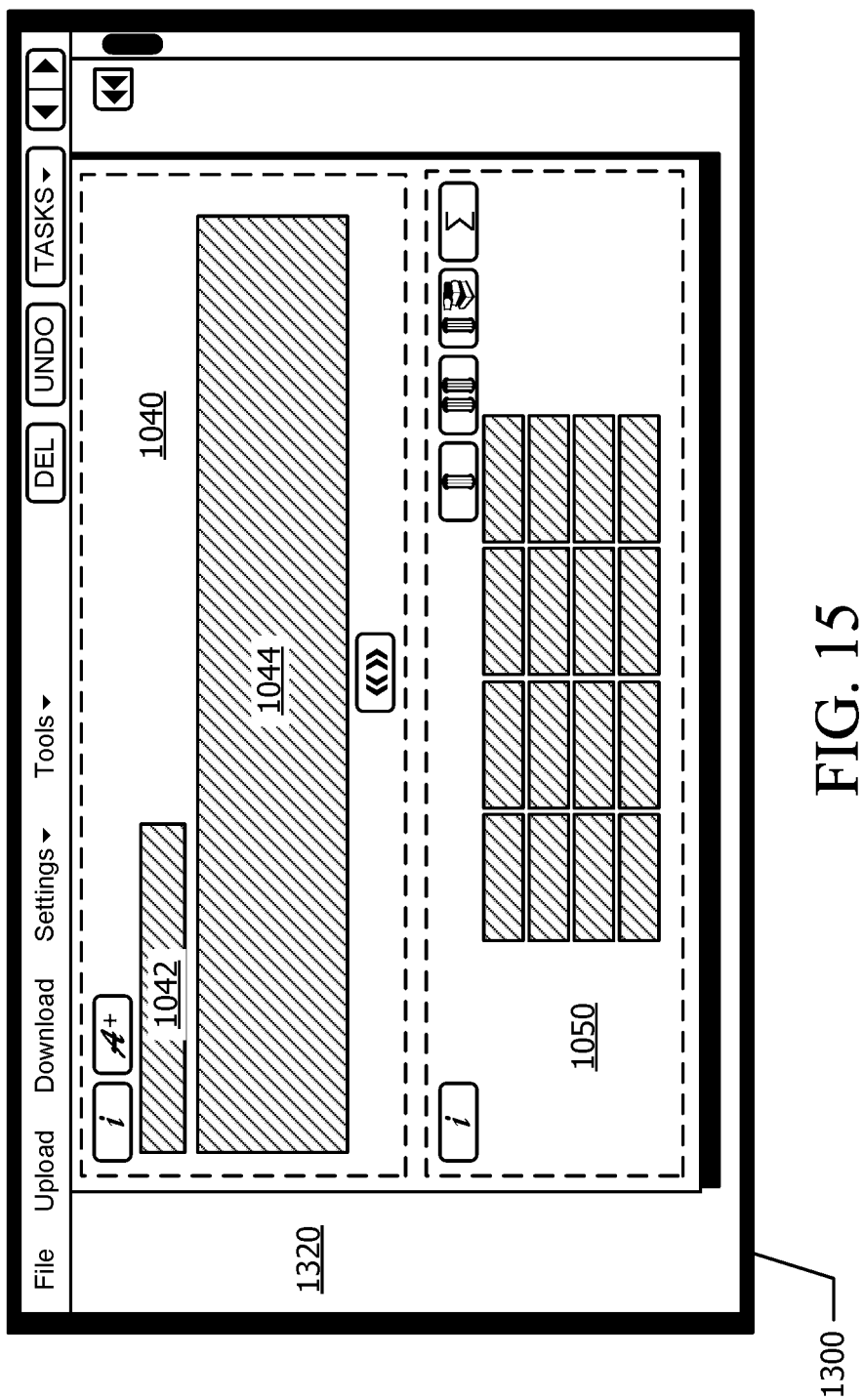

An option for navigation within the document is illustrated in FIG. 14. The "tasks" action element 1316 is actuatable (e.g., by clicking, tapping, or otherwise invoking the corresponding user interface action using a user input mechanism such as pointing device, touchscreen, or voice command) to invoke a selection user interface element 1410, which lists a set of prescribed elements 1414 for the document's type, and corresponding indicators 1412 identifying the presence information and state of each prescribed element. In this example, the indicators 1412 indicate whether the element is present and considered "complete" (i.e., all sub-elements of the prescribed element, if any, are present), "incomplete" (at least one sub-element of the prescribed element missing, and at least one sub-element present), or absent from the document currently displayed (missing entire prescribed element). In the illustration of FIG. 14, the "complete" indicator is a solid circle; the "incomplete" indicator is a partially filled circle; and the "absent" or "missing" indicator is an empty circle. Other graphical indicators may be used. Selection of a particular prescribed element such as 1416 from the set 1414 results in the document display region 1320 being updated to display the portion of the document 1322 containing the selected element, if not already displayed. FIG. 15 illustrates a possible resultant view of the graphical user interface 1300 as a result of selection of the prescribed element indicated at 1416.

While in FIG. 14 the prescribed elements in the list 1414 in the selection user interface element 1410 are arranged in order of expected or actual appearance in the document 1322, the prescribed elements may be arranged in other orders, such as alphabetically or in order of completeness. The ordering of the prescribed element list 1414 may depend on the requirements for the document set out in the framework for the document; for instance, in some cases it may be a requirement in the framework that the prescribed elements follow a prescribed order, in which case it may be preferred to have the ordering of the prescribed elements in the list 1414 correspond with the prescribed order. Thus, the document type or framework will determine the appearance of the selection user interface element 1410.

The selection user interface element 1410 may be a drop-down list, populated using the state information determined by the server during preparation of the altered document. Data for the drop-down list can be delivered together with the altered document to the client system 110, or separately from the altered document.

Figure 16:
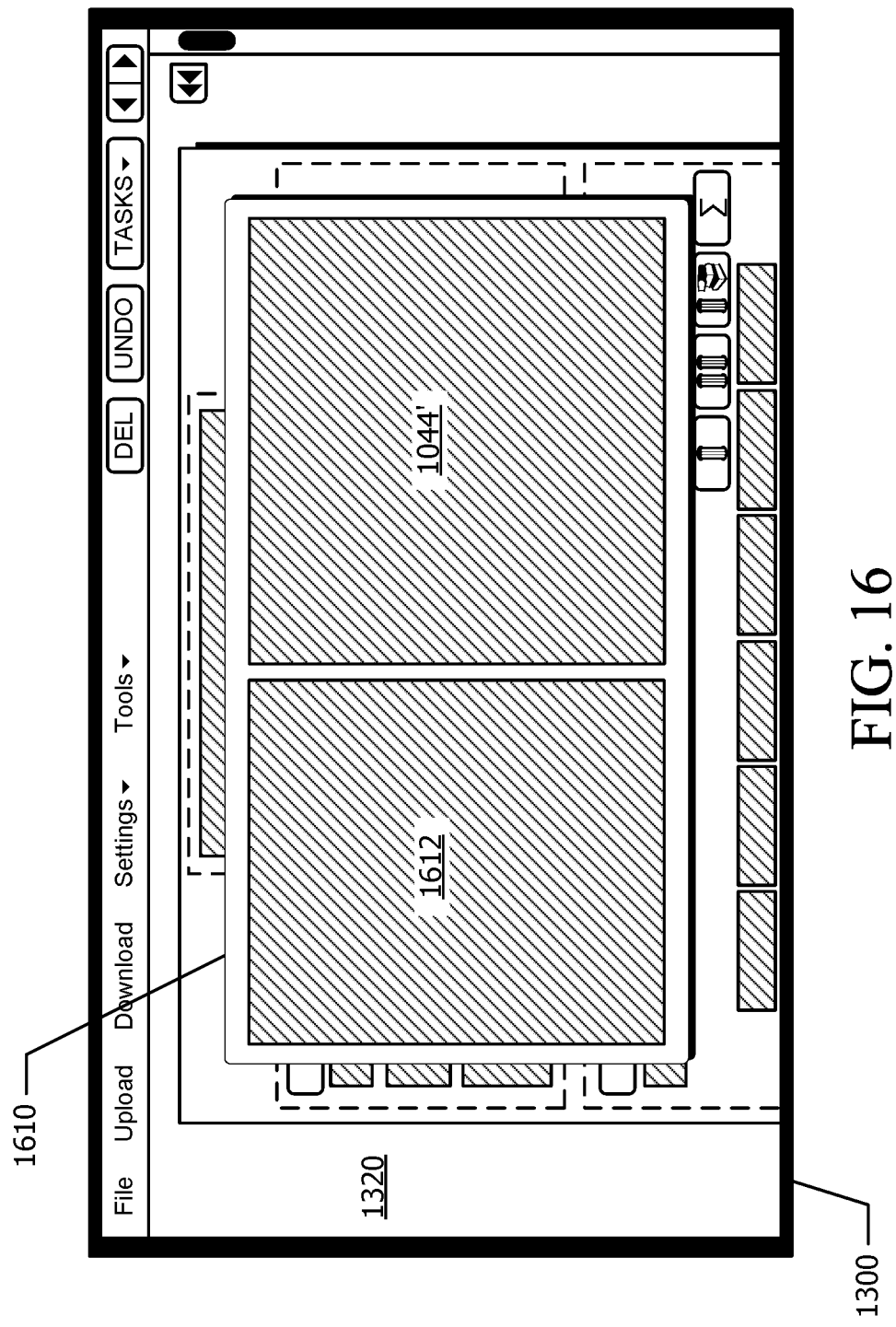
FIG. 16 is an illustration of a graphical user interface displaying related citations or references for a selected element of the altered document.

Actuation of the various user interface elements 1201-1209 results in execution of code to implement the associated task with the identified prescribed element or sub-element as a target of the task. FIG. 16 illustrates an example of the graphical user interface 1300 resulting from actuation of an informational or reference task, such as those associated with user interface elements 1201 and 1202. In this example, the task results in display of an overlay pane 1610 over the document display region 1320. The overlay pane 1610 includes, in this example, a reference information display region 1612, which comprises on-point reference material relating to the target prescribed element or sub-element, and optionally element display region 1044', which reproduces some or all of the content of the prescribed element, such as the content of content portion 1044. In some implementations, only the reference information display region 1612 is included; however, where the reference information display region 1612 displays "best example" content, it is preferable to include the element display region 1044' so that the user can make comparisons between the best example and the actual document content. The reference information display region 1612 can include navigation user interface elements, such as a drop-down list, to permit the user to select and display other sections in the on-point reference material by subject or keyword. The user is thus not limited to the on-point reference material relating to the specific target prescribed element or sub-element. The region 1612 can also include a search interface to permit the user to locate specific reference sections. The content of the region 1612 may be automatically retrieved as a result of a look-up query sent to the server 200 for content tagged as relevant to the type or category of the target prescribed element in response to invocation of the task, without requiring the user to input a particular query keyword or instruction. In this informational or reference task, the comparison need not be automated; however, automatic identification of on-point reference material for the prescribed element facilitates and potentially speeds review of the document, since there is no need to separately query reference materials (for example, using a separate application not integrated into the graphical user interface, or looking up relevant points in printed material).

Optionally, the element display region 1044' is configured to permit edits to the displayed content. Additional application chrome, such as user interface elements to close (dismiss) the overlay pane 1610, locate or search for additional reference content, scroll through either the reference content or document content in regions 1612, 1044', editing tools for the content of region 1044', etc. may be included in the overlay pane 1610, but are not illustrated in FIG. 16.

Figure 17:
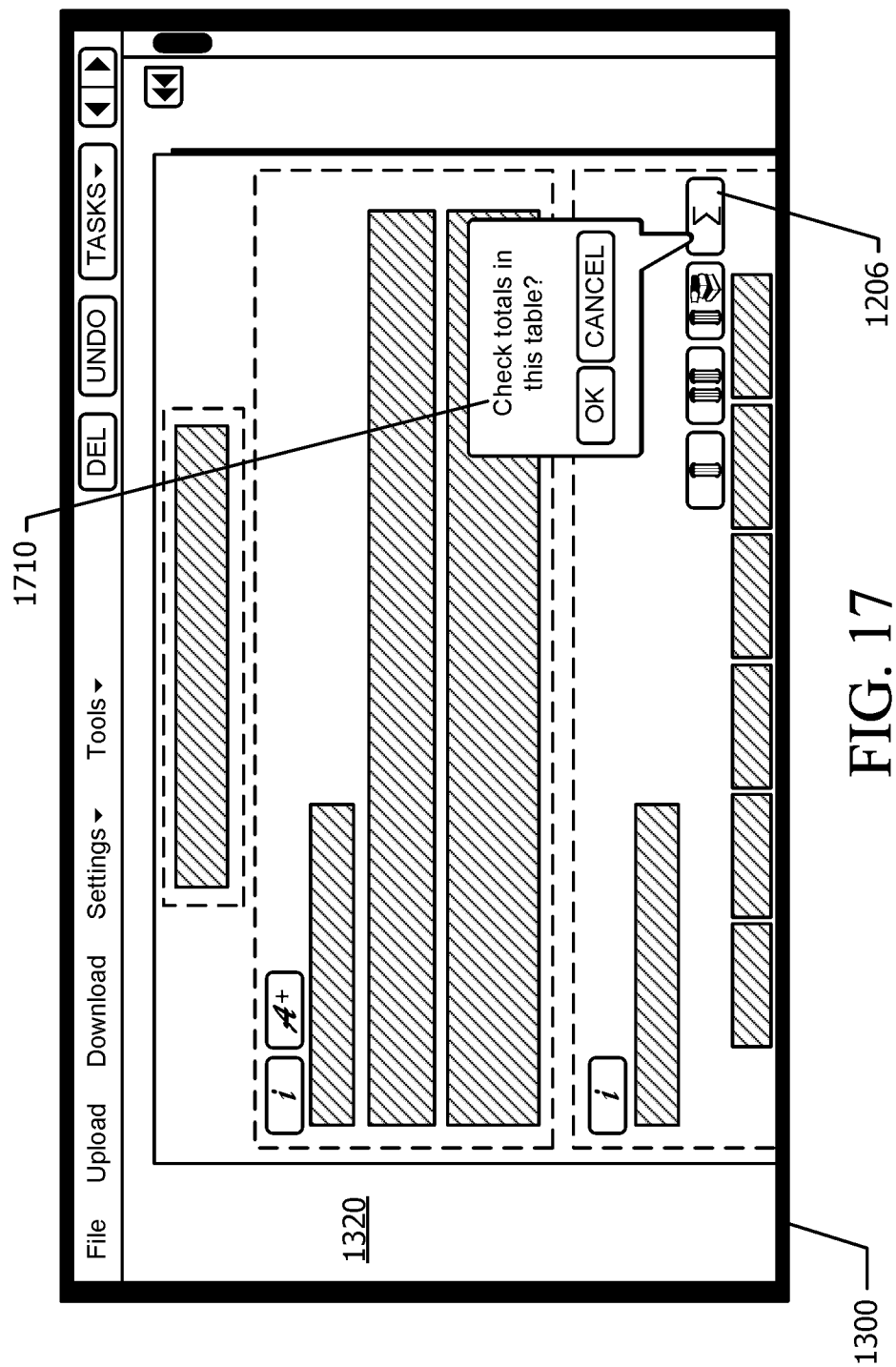
FIGS. 17 and 18 are illustrations of a graphical user interface during an operation on a selected element of the altered document.
Figure 18:
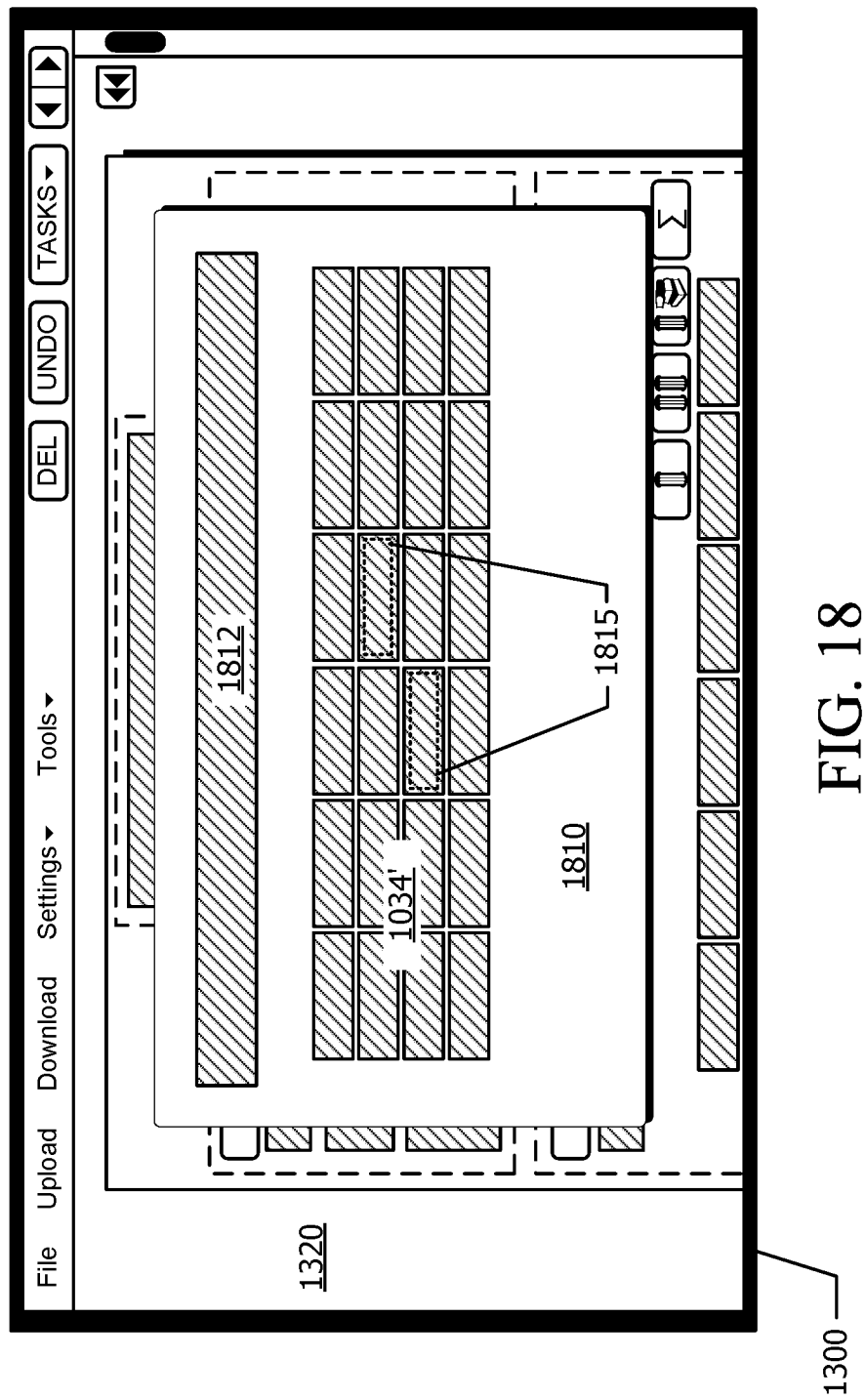

FIG. 17 illustrates a possible appearance of the graphical user interface 1300 in response to invocation of the user interface element 1206 corresponding to a "check totals" consistency-checking validation task, in which values in columns or rows of tabular data identified as totals are compared to other values in the table to confirm that the other values sum to the stated totals. While spreadsheet tools are available for carrying out such procedures, it is not unusual for tabular data in reports to be cut and pasted from the original source, and values updated to reflect changed information; this may occur, for instance, when reporting and updating salaries and total compensation levels for officers in a corporate disclosure document. The updating of such information, however, may result in inaccuracies within the table. In FIG. 17, in this example, an initial dialog box 1710 is displayed in response to actuation of the user interface element 1206 to confirm that the validation task should proceed. On confirmation, a new overlay pane 1810 is displayed, as illustrated in FIG. 18. This overlay pane 1810 includes a display of the content of the prescribed element 1034' that is the identified target of the task. The displayed content includes, in this example, markup or highlighting 1815 to illustrate detected errors or discrepancies in the table content, and optionally recommended corrections to rectify the detected errors or discrepancies. The identification of totals and other values may be based on column header information within the table (for instance, by a comparison of the header information against standardized text or validators). The overlay pane 1810 may include further user interface elements 1812 for user editing of the content shown in the displayed prescribed element 1034', undoing changes, and dismissing the overlay pane 1810, printing the displayed content, moving to the next or previous prescribed element, etc. In some implementations, when errors or discrepancies with regard to reference or comparative content (such as other tables in the document or from other sources) are detected and indicated in the displayed document content, rather than manually editing the document to address any errors or discrepancies, the user can instead invoke an instruction to have any recommended corrections automatically applied. These recommended corrections may be formatted within the displayed document in a "markup" format so that the user can review the changes; or alternatively, a list of the corrections may be generated and presented in an accompanying report.

Figure 19:
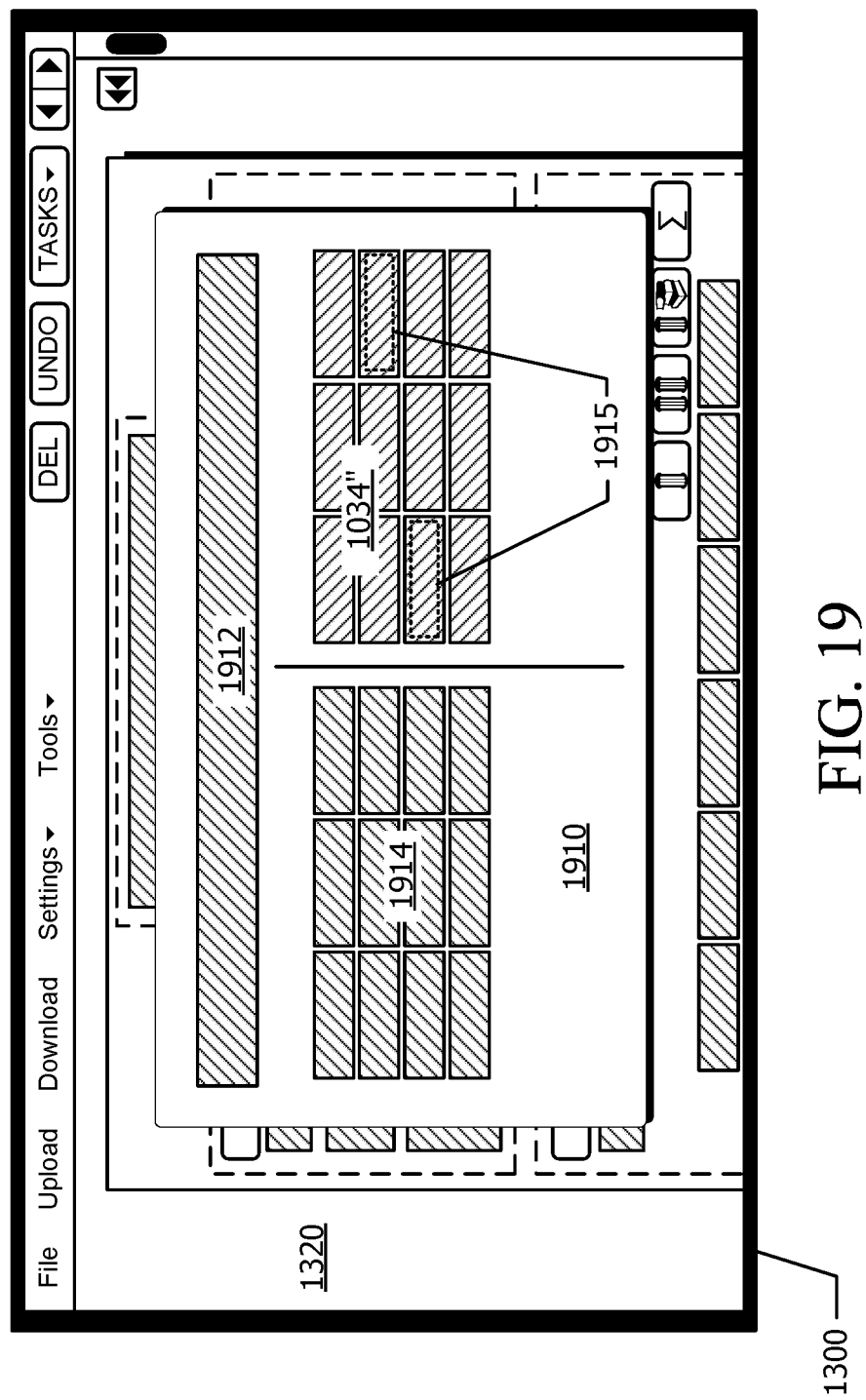
FIG. 19 is an illustration of a graphical user interface during a further operation on a selected element of the altered document.

FIG. 19 illustrates an example view of the graphical user interface 1300 in response to actuation of the user interface element 1207 or 1208 to compare columns of tabular content to reference tabular content sourced from another table within the document itself, or from extrinsic material such as another document or reference material, and to validate the content of the tabular content for consistency with these other sources. In response to actuation of the user interface element 1207 or 1208, an initial dialog box may be displayed to permit the user to select the source for the tabular content to be compared (not shown). The source may be retrieved from the server 200, or uploaded by the user at the client system 110.

Once selected, the overlay pane 1910 may be displayed, including various editing, etc. user interface elements 1912 (similar to user interface elements 1812); a reference or comparator display region 1914, containing at least a portion of reference tabular content to be compared to the target prescribed element; and a prescribed element display region 1034", displaying the content of the prescribed element associated with the actuated user interface element 1207, 1208. Again, the task may automatically identify discrepancies between the reference tabular content and the actual document content, and indicate them by markup or highlighting 1915, optionally together with recommended corrections to rectify the detected discrepancies.

In those circumstances where consistency between actual document content and reference content is being evaluated, the user may be permitted to set different levels of tolerance. For instance, a strict tolerance level may require an exact match between content of the prescribed content in the document and the reference content (e.g., exact title or header match for each column or row, exact value match for remaining cells), or a more relaxed tolerance level that permits synonyms, grammatical variations, etc.

Figure 20:
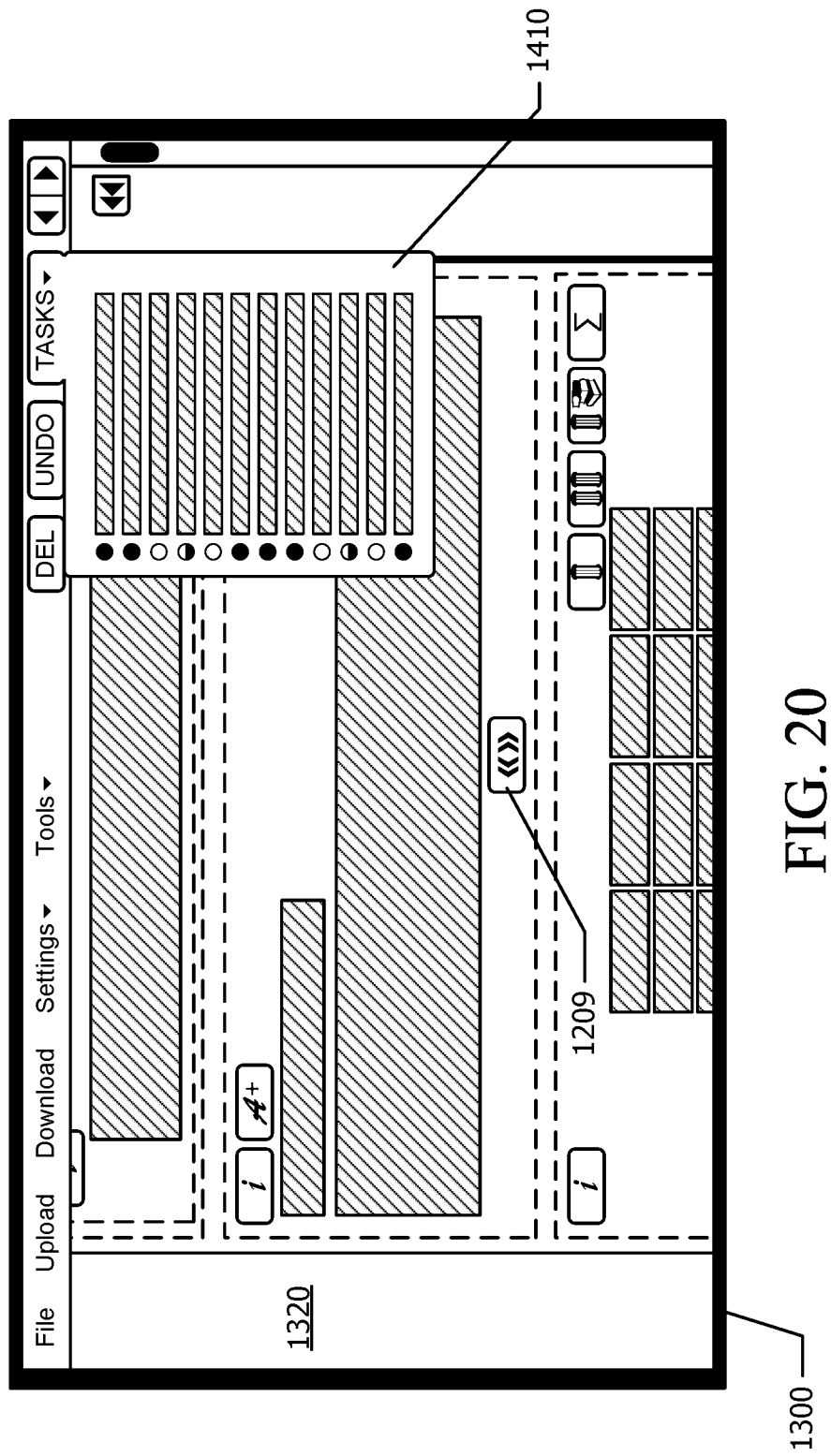
FIGS. 20 to 23 are illustrations of a graphical user interface during operations to insert a further element into the altered document.

As mentioned earlier, some prescribed content may be determined to be missing from the document when the altered version of the document is originally prepared. Location and insertion of missing content may be implemented through execution of a "missing parts" task, which in the illustrated examples can be invoked from within the document through an embedded task user interface element 1209 if included in the altered document, or else via the selection user interface element 1410 listing all prescribed elements for the document type. FIG. 20 illustrates both in the graphical user interface 1300. Thus, tasks may be invoked through the embedded code within the document, or using accompanying menu or selection user interface features.

Figure 21:
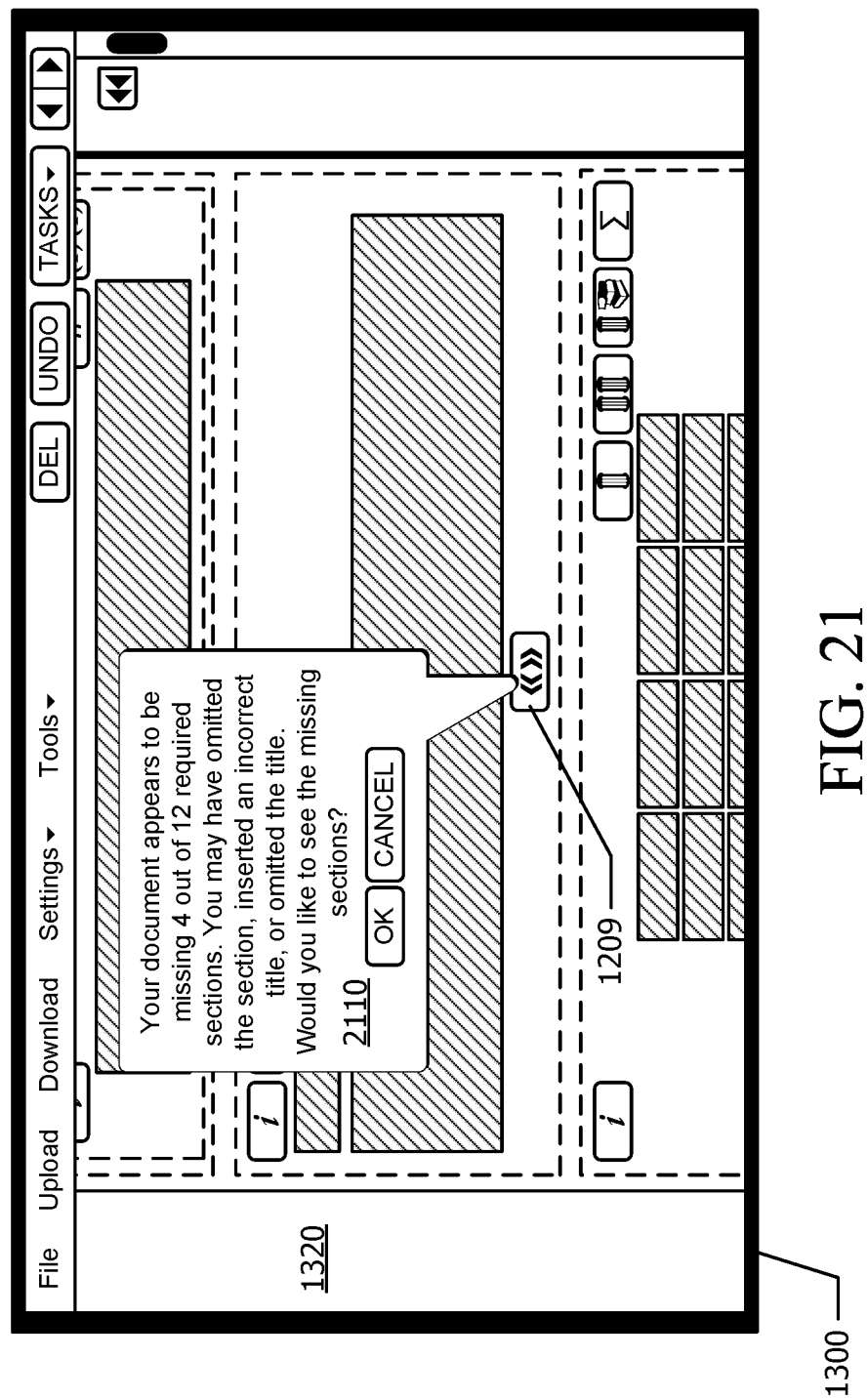

FIG. 21 illustrates a possible response to actuation of the user interface element 1209. In this example, a dialog box 2110 is displayed indicating to the user the general status of missing prescribed elements in the document, and providing the option to view the missing components. The content of the dialog box, as with other dialog boxes implemented in response to actuation of one of the task user interface elements 1201-1209, may also be embedded in the altered document with the display code.

Figure 22:
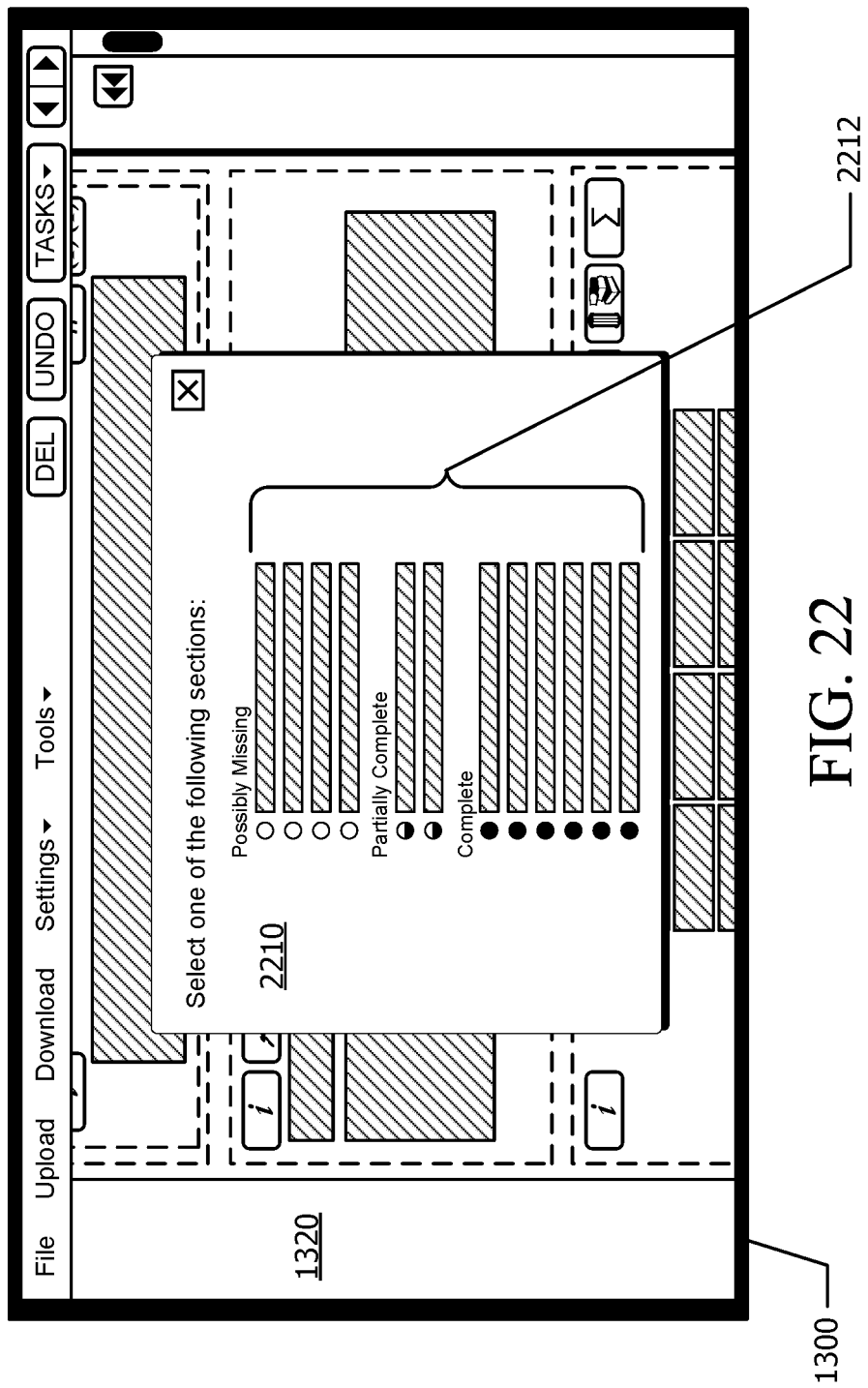
Figure 23:
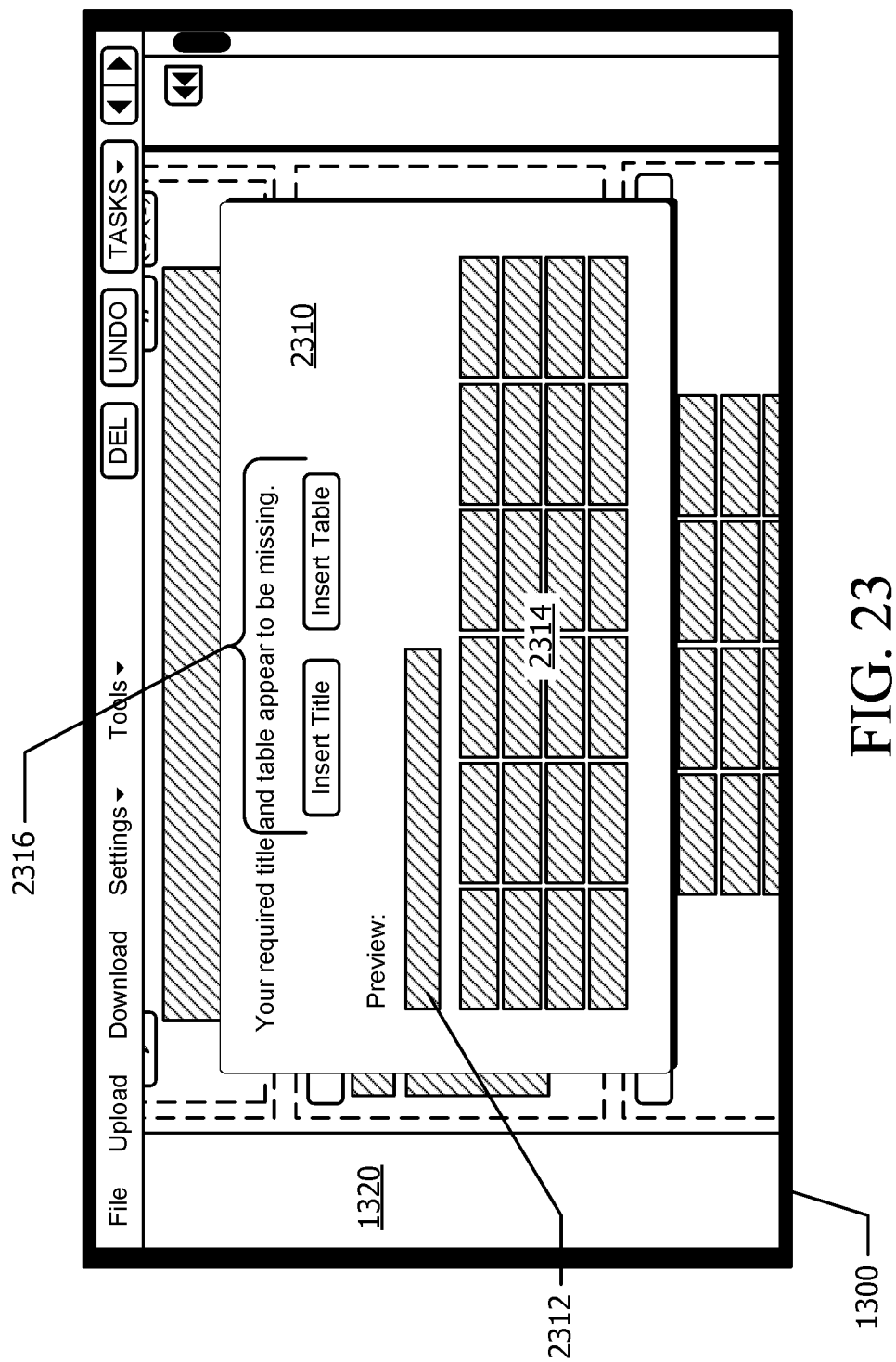

FIG. 22 illustrates a further view of missing components in the document. The graphical user interface 1300 now includes a further overlay 2210 listing prescribed elements identified as missing, partially complete, and complete. Not all prescribed elements need be presented in the listing 2212; for example, the completed elements may be omitted. Selection of one of the prescribed elements in the overlay 2210, in this example, may result in the document display region 1320 being updated to show the relevant part of the document, such as the location of a partially complete prescribed element, or the expected location of a missing prescribed element. In this example, however, a further overlay 2310 is displayed, displaying either the content of the prescribed element as it currently exists, if it is incomplete but present; or else a preview of content to be inserted into the document 2312, 2314, as illustrated in FIG. 23. In the example of FIG. 23, the overlay 2310 provides options 2316 to insert the content determined to be missing from the document; in this case, either a title, a table, or both. The preview content 2312, 2314 may be stored at the server 200 as template content 464 in the framework for the document. In response to the selection of one of the prescribed elements in the overlay 2210, a request for the preview content including an identifier of the prescribed element is transmitted to the server 200. At the server 200, the preview content corresponding to the identified prescribed element is retrieved from the template content. If the content is inserted into the document, it may be inserted into an automatically determined location, inserted in a current location of a cursor or insertion point in the document 1322, or else appended to the end of the document. The content, once inserted, is formatted in a similar manner to surrounding content.

If the prescribed content is only partially complete, and not altogether missing, the overlay 2310 may display the current content of the document together with a preview of the missing content for insertion.

In all of these overlay examples, the user may be permitted to edit the prescribed element displayed in the overlay. When the overlay is not displayed, editing functions may be made available in the document display region 1320 to permit, preferably, WYSIWYG editing of the various content portions of the document. It should be noted that it is not necessary for task results or other information to be displayed in an overlay pane as illustrated in the accompanying drawings. Content relating to a task may be presented in other forms. For example, proposed changes to the document may be displayed inline in the document content, or elsewhere in the graphical user interface without interfering with the visibility of the document, such as in an adjacent pane of the graphical user interface.

Figure 24:
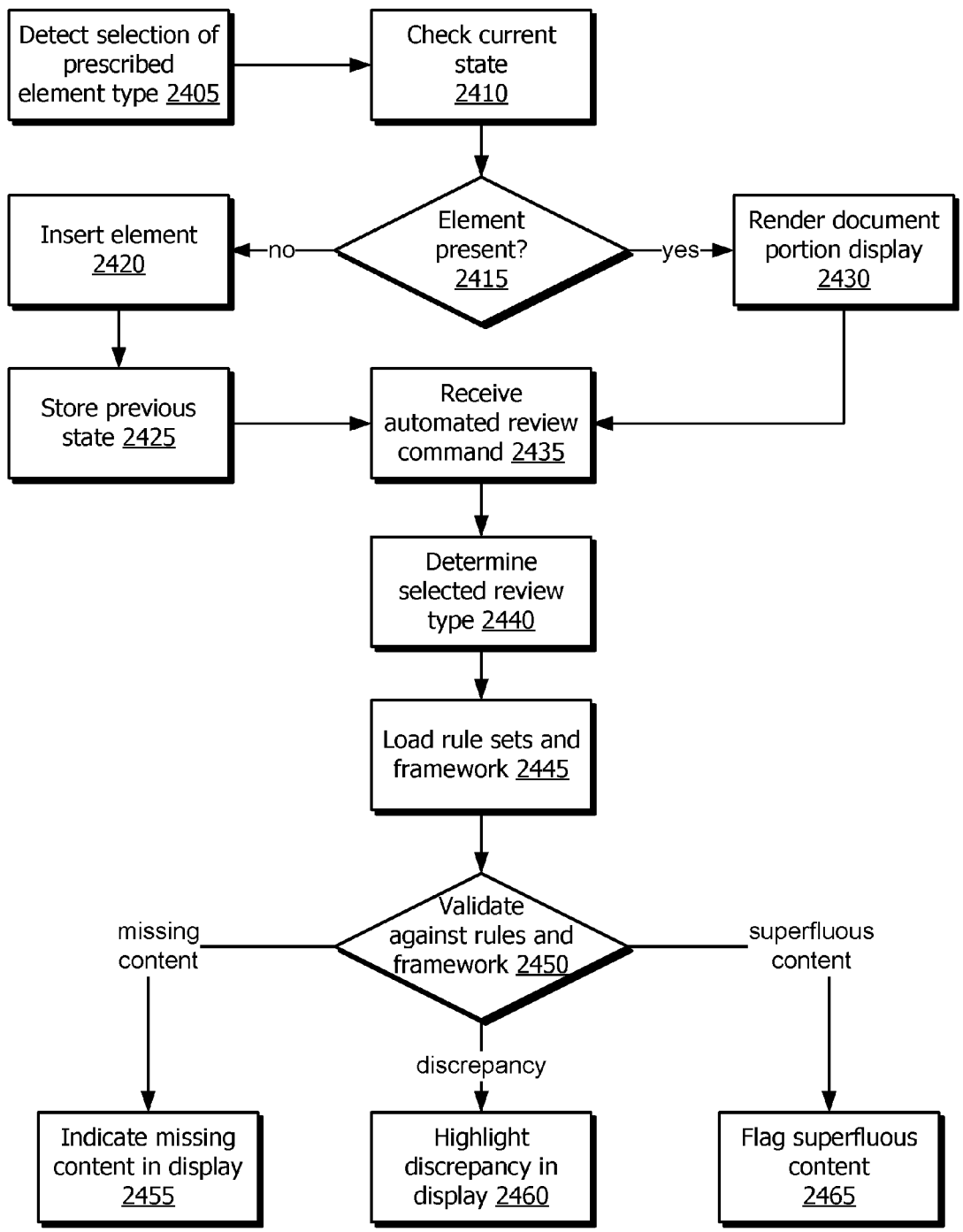
FIG. 24 is a flowchart illustrating a process for operating on elements of the altered document.

FIG. 24 illustrates an overview process for handling document editing and validation at the client system 110, starting for example at the graphical user interface 1300 of FIG. 14. At 2405, selection of a particular prescribed element from the selection user interface 1410 is detected. In response to the detected selection, the current state of the element is determined at 2410. If the prescribed element is not present, then a dialog or overlay to permit insertion of the missing prescribed element (e.g., as shown in FIG. 23) may be displayed, and in response to a user instruction to insert the missing prescribed element, the element is inserted at 2420. In order to ensure that significant changes to the document such as insertion of a prescribed element can be rolled back using, for example, the rollback module 370 at the server system 200, the previous state of the prescribed element is stored at 2425 in server memory. In this case, the previous state is "missing". On the other hand, if the prescribed element is present, or at least partially present, the display at the client system 110 is updated as necessary to display the relevant part of the document containing the prescribed element at 2430.

Subsequently, at 2435, a command to conduct automated review or validation of the prescribed content is received. This may be one of the validation or consistency checking tasks represented by user interface elements 1203-1208; thus, the command may be invoked by executing embedded display code in the document. At 2440, in response to invocation of the task, the type of task or review type is determined based on the identifiers or other code embedded in the document; then any appropriate rule sets are loaded at 2445. If validation tasks are handled at the server 200, then the determination of the type of task or review 2440 and loading of rule sets and templates 2445 are carried out at the server system 200. Next, the server 200 carries out validation of the prescribed element content against the framework at 2450. The result, at this stage, may be a determination that content is missing 2455 (e.g., a title is missing); a discrepancy 2460 (such as a total that does not match other data in the table, or a mismatch between the wording of the document and predefined prescribed element wording); or in some cases, where the task includes such identification, an identification of superfluous content 2465 in the document (e.g., extra language that is not specifically required for the prescribed element).

Figure 25:
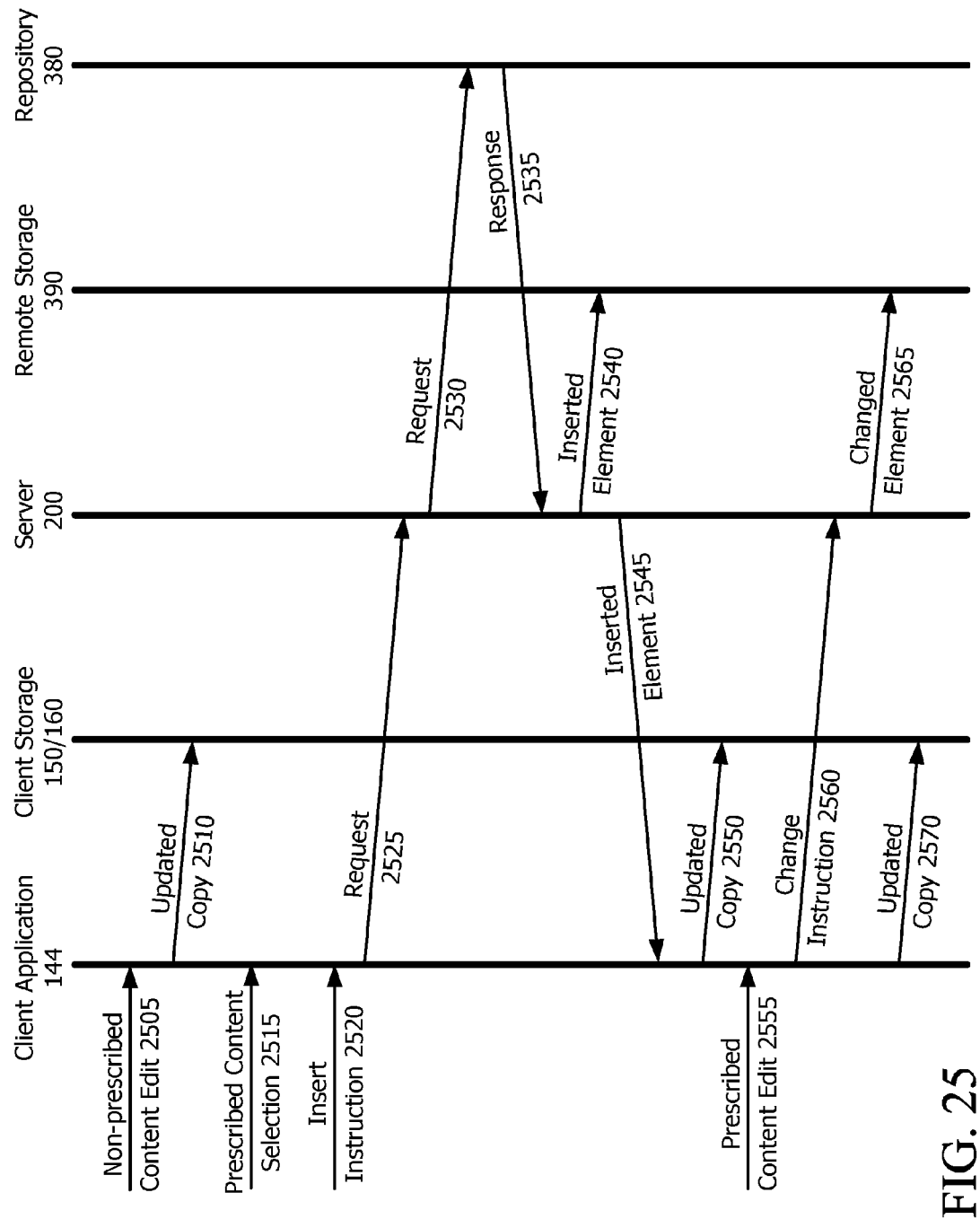
FIG. 25 is an interaction diagram illustrating data flow between various client and server components in response to changes to the altered document.

FIG. 25 illustrates interactions between the client system components and server components during the course of editing the altered document at the client system. In a client-server implementation, it may be desirable for not only the client system 110 to maintain backup copies of the document during editing, but also to have changes to the document mirrored or tracked at the server system 200 to permit restoration of the document to a prior state. For efficiency, certain changes may be stored only locally, while other changes are transmitted to the server. The displayed version of the document, however, contains all current changes until the system receives an instruction to roll back the document to an earlier revision. Changes may be handled differently depending on whether the changes are made to a prescribed content portion of the document, or to a non-prescribed content portion.

FIG. 25 illustrates that when an edit is made to a content portion of the document containing non-prescribed elements at 2505, an updated copy 2510 of the document at the client system is stored locally in client storage 150 or 160. However, when a prescribed element or sub-element is selected 2515 and, for example, an instruction 2520 is received to insert the element into the document, a request 2525 is sent to the server 200 identifying the prescribed content type, and if required the document type. This request is triggered by execution of the task associated with inserting a missing part, invoked at the client. The server 200 receives the request, and queries 2530 the repository 380 for the relevant rules for the identified element. The repository 380 responds 2535 with the relevant rules and associated information, which includes data for the element to be inserted. As described in connection with FIGS. 20-23, the user may be given the option to preview the content to be inserted, and to instruct its assertion. If this occurs, additional communications between the server and client, not illustrated in FIG. 25, will occur, where the preview content is sent by the server 200 to the client for display, and in response to an instruction received at the client to insert the content, a further instruction is sent back to the server to complete the insertion. Once this instruction is received, both the server and the client must insert content in their respective copies or backups of the document. The server 200 stores a copy of the element as inserted 2540 in server storage 390, and transmits the element 2545 to the client, if it has not been sent already. The client system then updates its copy of the document with the inserted element and stores an updated copy of the document 2550 in its local storage. As the user may customize the insertion point for the newly added content, the location of the added content within the document may also be transmitted to the server 200, either in a separate transmission or together with the request 2525.

When a change is made to a content portion containing a prescribed element 2555 at the client system 110, a change instruction 2560 is sent to the server 200. The change instruction may contain only the relevant content portion, or alternatively the entire prescribed element content that contains the edit. This changed data is then stored in the server's storage 390. The client system also updates the copy of the document 2570 stored its own memory. Thus, changes to the document at the client system 110 are selectively stored at the server, but are retained at the client in client memory.

Figure 26:
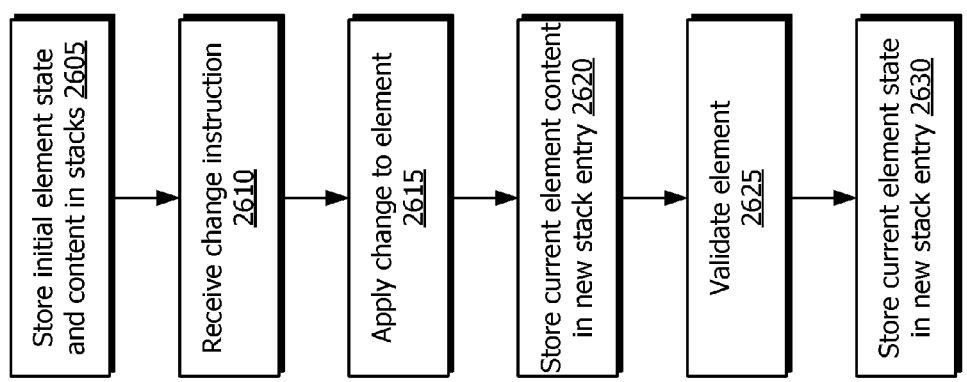
FIG. 26 is a flowchart illustrating one possible process for server handling of changed and validated elements of the altered document.

When a change to prescribed element content is made, the status of the prescribed element may change: insertion of a prescribed element may result in a change to the element's presence from "missing" to "incomplete" or "complete", while other edits may result in removal of a required element or sub-element. Thus, when changes are made to content portions containing prescribed content, the server also validates the changed content to confirm or update the status of the prescribed element in the document. FIG. 26 is an overview method for this validation. Initially, at 2605, an initial state for each prescribed element is stored in a memory stack as described above. A different stack may be allocated to each prescribed content element of the document. At 2610, when a change instruction is received, the change is applied to the prescribed element content at 2615, and the now-current content for the prescribed element is stored in a new entry in the corresponding stack at 2620. Next, the prescribed element content is validated 2625 at the server to determine the presence or absence of the element and any required sub-elements, as generally described earlier. The current element state is also stored in the new stack entry at 2630.

Figure 27:
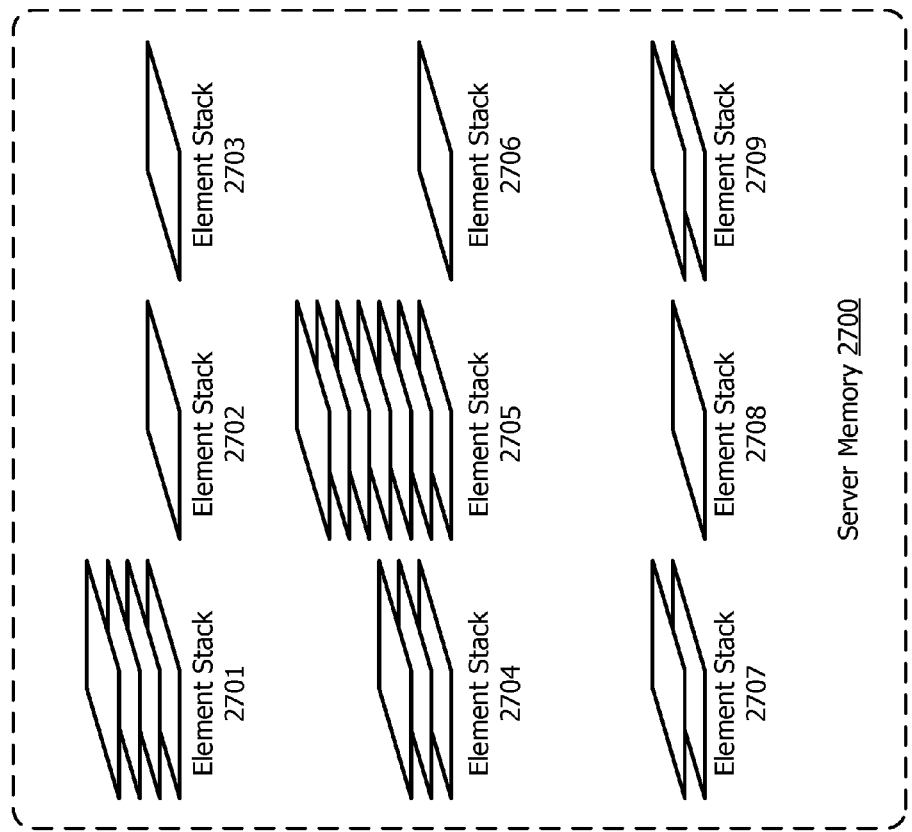
FIG. 27 is a schematic illustrating possible states of a memory stack at the server.

FIG. 27 is a schematic of the possible stacks 2701-2709 in an instance of server memory 2700 for a set of nine prescribed elements in a given document. This schematic illustrates that some prescribed elements may have undergone more edits and state changes than other prescribed elements. Because this backup information is stored at the server, it may be possible for the user to request that a given prescribed element in the document be rolled back to a prior version; in response to such a request, the server may retrieve the appropriate version and transmit the data to the client, and optionally discard any subsequent versions of the prescribed element. Because data is stored for each prescribed element in distinct memory stacks, different prescribed elements may be rolled back to different versions. It will be appreciated that the foregoing description of tracking and storing elements at the server system 200 can apply to both prescribed elements and sub-elements thereof.

Figure 28:
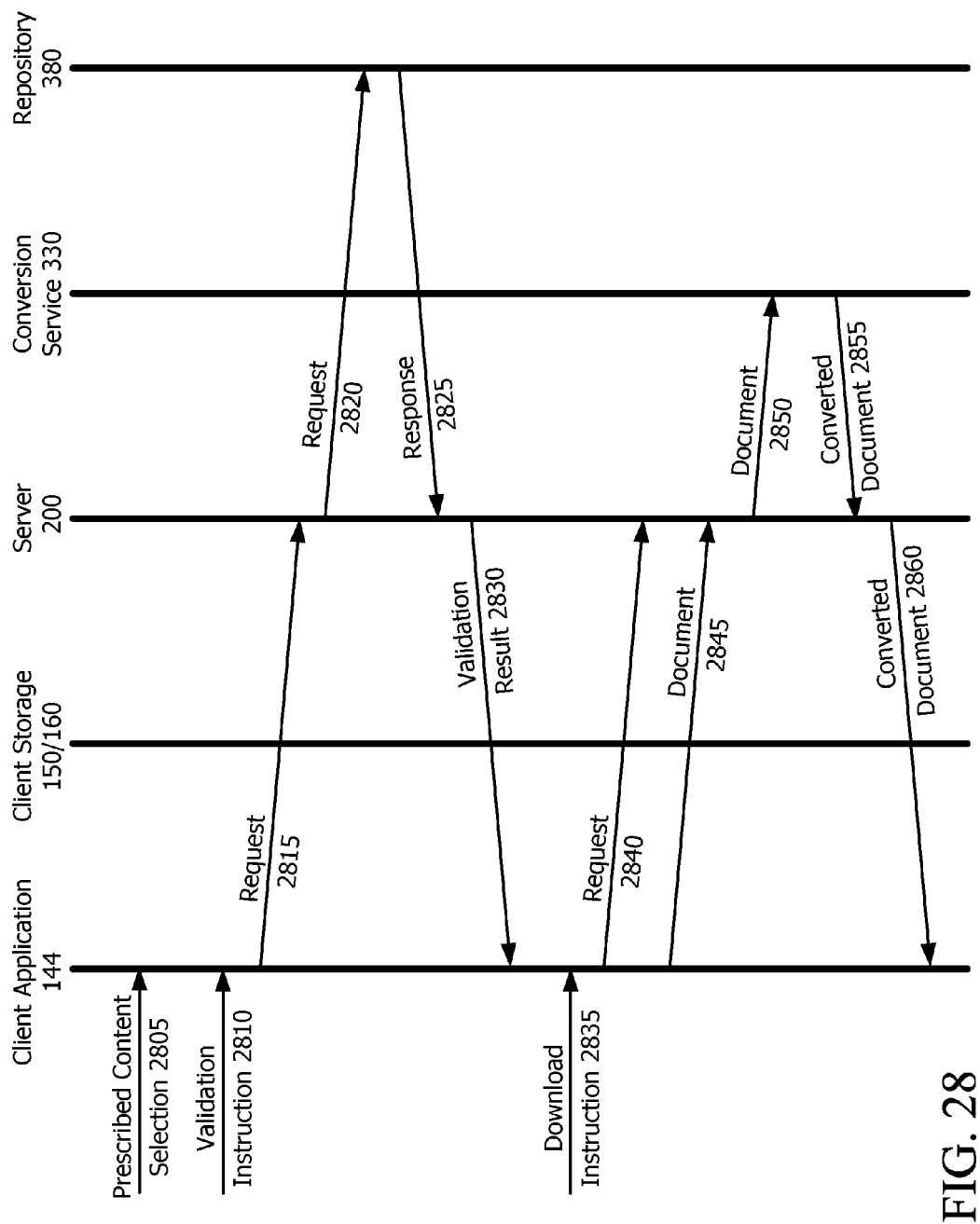
FIG. 28 is an interaction diagram illustrating data flow between various client and server components in response to validation and download instructions.

FIG. 28 illustrates interaction between the client system 110 and the server system 200 when a validation task, such as checking table totals, is invoked. In this implementation, the server executes the validation task and sends the result to the client. The client system receives a selection of a particular prescribed element or content portion at 2805, and an instruction to invoke a validation task at 2810. The request to execute the task 2815, including an identifier for the target prescribed element for the task, is sent to the server 200, which requests any relevant rules from the repository 380 at 2820. When the relevant information is received 2825 from the repository 380, the server 200 executes the validation task against a copy of the prescribed element content from the document (either received with the request 2815, or else retrieved from server memory 390). The validation result 2830, which can include marked up or highlighted content identifying discrepancies or other issues, is then sent to the client system 110 for display. The user may then choose to edit the content of the document, as discussed above, to address any discrepancies or other validation results; as mentioned above, recommended corrections to rectify discrepancies may be automatically applied on user instruction.

When the user wishes to download a final version of the document, with all changes integrated into the document, the server may be instructed to collate the prescribed content with other document content and to send the final version to the client system 110. However, since some non-prescribed content may be edited and stored in the client's local memory, the process illustrated in FIG. 28 may be used. When an instruction to download a final version of the document 2835 is received at the client system 110, the client sends a request 2840 as well as the locally-stored version of the document 2845 to the server system 200. The client version of the document includes all changes currently applied to the document.

It is contemplated that the final version of the document will be deliverable in the original format that the document was originally received, such as PDF or a word processing format. Thus, at 2850, the server system 200 sends the document to the conversion service 330 to have the document converted back to the original format. The conversion process may also include removal of any display code or identifiers that were previously embedded by the server during initial processing. This removal may be carried out by the server system 200 rather than the conversion service 330. The conversion service 330 then returns the converted document 2855, which in turn is sent by the server 200 to the client at 2860.

In some implementations, the user may not wish to have the document returned in its original format, but may request a different format. Either the server 200 may generate the document in this different format, or else the conversion service 330 may be used.

The downloaded final version of the document can be subsequently edited by the user without using the server system 200, the web browser application 142 adapted to carry out the above-described functions, and/or the dedicated document editing and verification tool, for example using any appropriate editing application compatible with the downloaded document format. For instance, if the final version of the document is returned to the client system 110 in a word processing format, the user can subsequently open the document in a suitable word processing program, and make any desired edits. The edited document can then be uploaded to the server system 200 and processed as described above in a subsequent session. It will thus be appreciated by those skilled in the art that the user could create or edit the originating document 10 using the user's preferred document editing program and save it as an electronic file at the client system 110, and upload this saved file as the document 20 for processing by the server system; make use of the various validation and other features as described above, then download a final copy of the document 50; make further edits to the document 50 using the same preferred document editing program or a different program, or send the document 50 to another user who makes changes to the document using their own selected document editing program; and then the user, or the other user, may again upload this edited version of the document 50 to the server system again, for further validation and other tasks as described above.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments. Further, while the foregoing examples were described and illustrated with reference to a handheld mobile device with a touchscreen interface, they may be implemented with suitable modification on a computing device with a larger display screen or without a touchscreen interface. Where a touchscreen interface is not employed, user input via the graphical user interface may be received from a pointing device and/or a keyboard. Further, while these examples have been illustrated in the context of a full-screen application, where the unified event listing view fills an entirety of the available screen space allocated to application views, these examples may be modified for use in an environment in which applications are displayed only in a window or portion of the screen (i.e., not occupying the entire display screen).

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A method implemented in a data processing system for processing a document, the method comprising:
receiving an electronic version of a document comprising a plurality of content portions;
identifying a plurality of prescribed elements for the document, wherein at least some of the plurality of prescribed elements are identified based on a document type for the document;
correlating at least some content portions in the editing copy of the document to corresponding prescribed elements of the plurality of prescribed elements;
determining a state value for each prescribed element of the plurality of prescribed elements according to the correlation, the state value corresponding to one of present, missing, or incomplete;
generating an editing copy of the document, the generating comprising embedding code in the editing copy of the document, the code identifying at least one task corresponding to at least one content portion of the document, the code defining at least one user interface element for presentation within the editing copy when the editing copy is rendered and presented;
transmitting, to a user system, the editing copy of the document including the embedded code and the state value for each prescribed element of the plurality of prescribed elements for rendering and presentation by the user system;

receiving, from the user system, an instruction to add a new content portion not included in the plurality of content portions to the editing copy of the document;

storing the new content portion at the data processing system;

correlating the new content portion to a prescribed element of the plurality of prescribed elements;

updating the state value for the correlated prescribed element; and transmitting, to the user system, the updated state value.

2. The method of claim 1, wherein presentation of the editing copy comprises display of the editing copy, and presentation of the at least one user interface element comprises presentation of the at least one user interface element in a position substantially adjacent to its corresponding content portion, at least some of the at least one user interface elements being displayed between sequential content portions of the plurality of content portions.

3. The method of claim 1, wherein generating the editing copy of the document further comprises converting the received electronic version of the document from a first format to a second format adapted for rendering with the embedded code.

4. The method of claim 1, wherein the receiving the electronic version of the document, generating the editing copy of the document, and transmitting the editing copy of the document are carried out for a plurality of documents received by the data processing system, each of the plurality of documents being received comprising a distinct presentation format for use in presentation of the document.

5. The method of claim 1, wherein embedding code in the editing copy of the document comprises embedding code identifying at least one task corresponding to content portions correlated to prescribed elements.

6. The method of claim 1, wherein at least one of the plurality of prescribed elements is identified from text in a content portion of the document.

7. The method of claim 1, further comprising:
receiving, from the user system, a request to execute a task identified by embedded code, the request having been initiated by activation of one of the at least one user interface element identifying the task;
executing the task for the corresponding content portion by executing the code stored for the task; and
transmitting a result of the task to the user system for presentation within the editing copy at the user system, wherein the corresponding content portion is the new content portion, and the at least one task comprises a validation of the corresponding content portion with reference to the corresponding prescribed element.

8. The method of claim 7, wherein the validation comprises a comparison of the corresponding content portion and the corresponding prescribed element.

9. The method of claim 1, further comprising:
receiving, from the user system, a request to execute a task identified by embedded code, the request having been initiated by activation of one of the at least one user interface element identifying the task:
executing the task for the corresponding content portion by executing the code stored for the task; and
transmitting a result of the task to the user system for presentation within the editing copy at the user system, wherein when the request to execute a task comprises an instruction for a change to a content portion corresponding to a first prescribed element of the plurality of prescribed elements, executing the task comprises storing the change at the data processing system; and
when the request to execute a task comprises an instruction to add a new content portion corresponding to a second prescribed element of the plurality of prescribed elements, executing the task comprises storing the new content portion; and
when the request to execute a task comprises an instruction to validate a selected content portion corresponding to a prescribed element of the plurality of prescribed elements, executing the task comprises comparing the selected content portion to the corresponding prescribed element and updating a state value of the corresponding prescribed element according to a result of the comparison.

10. The method of claim 1, wherein transmitting the state value for each prescribed element of the plurality of prescribed elements comprises
transmitting additional code executable by the user system to present an, identification of each of the plurality of prescribed elements and their respective state value for user selection at the user system.

11. A non-transitory data processing system-readable medium bearing code which, when executed by one or more processors of a data processing system, causes the data processing system to:
receive an electronic version of a document comprising a plurality of content portions;
identify a plurality of prescribed elements for the document, wherein at least some of the plurality of prescribed elements are identified based on a document type for the document;
correlate at least some content portions in the editing copy of the document to corresponding prescribed elements of the plurality of prescribed elements;
determine a state value for each prescribed element of the plurality of prescribed elements, the state value corresponding to one of present, missing, or incomplete;
generate an editing copy of the document, the generating comprising embedding code in the editing copy of the document, the code identifying at least one task corresponding to at least one content portion of the document, the code defining at least one user interface element for presentation within the editing copy when the editing copy is rendered and presented;
transmit, to a user system, the editing copy of the document including the embedded code and the state value for each prescribed element of the plurality of prescribed elements for rendering and presentation by the user system;
receive, from the user system, an instruction to add a new content portion not included in the plurality of content portions to the editing copy of the document;
store the new content portion at the data processing system;
correlate the new content portion to a further prescribed element of the plurality of prescribed elements;
update the state value for the further prescribed element; and
transmit, to the user system, the updated state value.

12. The non-transitory data processing system-readable medium of claim 11, wherein presentation of the editing copy comprises display of the editing copy, and presentation of the at least one user interface element comprises presentation of the at least one user interface element in a position substantially adjacent to its corresponding content portion, at least some of the at least one user interface elements being displayed between sequential content portions of the plurality of content portions.

13. The non-transitory data processing system-readable medium of claim 12, wherein generating the editing copy of the document further comprises converting the received electronic version of the document from a first format to a second format adapted for rendering with the embedded code; and wherein
receiving the electronic version of the document generating the editing copy of the document, and transmitting the editing copy of the document are carried out for a plurality of documents received by the data processing system, each of the plurality of documents being received comprising a distinct presentation template for use in presentation of the document.

14. The non-transitory data processing system-readable medium of claim 11, wherein embedding code in the editing copy of the document comprises embedding code identifying at least one task corresponding to content portions correlated to prescribed elements.

15. The non-transitory data processing system-readable medium of claim 11, wherein the data processing system is further caused to:
receive from the user system, a request to execute a task identified by embedded code, the request having been initiated by activation of one of the at least one user interface element identifying the task;
execute the task for the corresponding content portion by executing the code stored for the task; and
transmit a result of the task to the user system for presentation within the editing copy at the user system,
wherein when the request to execute a task comprises an instruction for a change to a content portion corresponding to a first prescribed element of the plurality of prescribed elements, executing the task comprises storing a changed version of the content portion at the data processing system; and
when the request to execute a task comprises an instruction to add a new content portion corresponding to a second prescribed element of the plurality of prescribed elements, executing the task comprises storing the new content portion; and
when the request to execute a task comprises, an instruction to validate a selected content portion corresponding to a prescribed element of the plurality of prescribed elements, executing the task comprises comparing the selected content portion to the corresponding prescribed element and updating a state value of the corresponding prescribed element according to a result of the comparison.

16. The non-transitory data processing system-readable medium of claim 11, wherein transmitting the state value for each prescribed element of the plurality of prescribed elements comprises
transmitting additional code executable by the user system to present an identification of each of the plurality of prescribed elements and their respective state value for user selection at the user system.

17. A method implemented in a user data processing system, the method comprising:
obtaining an editing copy of a document, the editing copy comprising:
a plurality of content portions;
code embedded in the editing copy of the document, the code identifying at least one task corresponding to at least one of the plurality of content portions, the code defining at least one user interface element for presentation within the editing copy when the editing copy is rendered and presented; and
code executable to present an identification of a plurality of prescribed elements for the document and their respective state value, wherein:
at least some of the plurality of prescribed elements are identified based on a document type for the document;
the editing copy is generated from an electronic version of the document obtained at the client data processing system;
the state value for each prescribed element of the plurality of prescribed elements is determined by correlating at least some content portions of the plurality of content portions in the editing copy of the document to corresponding prescribed elements of the plurality of prescribed elements, the state value corresponding to one of present, missing, or incomplete;
rendering and presenting the editing copy, including the at least one user interface element, and the identification of the plurality of prescribed elements and their respective state value;
obtaining a new content portion that is added to the editing copy of the document, the new content portion not being included in the plurality of content portions;
receiving an updated state value for a further prescribed element of the plurality of prescribed elements, the updated state value being determined by correlating the new content portion to the further prescribed element; and
presenting the updated state value for the further prescribed element.

18. The method of claim 17, wherein presentation of the editing copy comprises display of the editing copy, and presentation of the at least one user interface element comprises display of each of the at least one user interface element in a position substantially adjacent to its corresponding content portion, at least some of the at least one user interface elements being displayed between sequential content portions of the plurality of content portions.

19. The method of claim 17, wherein obtaining the editing copy of a document comprises:
obtaining the electronic version of the document, the electronic version being in a first presentation format;
transmitting the electronic version of the document to a server system;
in response, receiving the editing copy from the server system,
wherein generating the editing copy comprises correlating at least some components of the document with corresponding prescribed elements of a plurality of prescribed elements previously defined for the document, those components thus correlated to a given prescribed element comprising a content portion;
for each content portion thus corresponding to a prescribed element, identifying the at least one task corresponding to said content portion, and thus embedding the code identifying the identified at least one task.

\* \* \* \* \*